(12) United States Patent
Suino

(10) Patent No.: US 7,302,104 B2
(45) Date of Patent: Nov. 27, 2007

(54) SMOOTHING TILE BOUNDARIES OF IMAGES ENCODED AND DECODED BY JPEG 2000

(75) Inventor: Tooru Suino, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 823 days.

(21) Appl. No.: 10/330,588

(22) Filed: Dec. 27, 2002

(65) Prior Publication Data

US 2003/0138154 A1 Jul. 24, 2003

(30) Foreign Application Priority Data

Dec. 28, 2001 (JP) ............................. 2001-400647
Jun. 19, 2002 (JP) ............................. 2002-178984

(51) Int. Cl.
 *G06K 9/36* (2006.01)
 *G06K 9/40* (2006.01)
 *G06K 9/46* (2006.01)

(52) U.S. Cl. ..................... 382/240; 382/264; 382/266

(58) Field of Classification Search ................. 382/240
See application file for complete search history.

(56) References Cited

U.S. PATENT DOCUMENTS

| 5,883,983 | A | * | 3/1999 | Lee et al. .................. 382/268 |
| 5,933,541 | A | | 8/1999 | Kutka et al. |
| 6,141,446 | A | * | 10/2000 | Boliek et al. ............... 382/233 |
| 6,539,060 | B1 | * | 3/2003 | Lee et al. ............... 375/240.29 |
| 6,668,097 | B1 | * | 12/2003 | Hu et al. .................. 382/275 |
| 6,810,086 | B1 | * | 10/2004 | Puri et al. ............... 375/240.29 |
| 6,856,706 | B2 | * | 2/2005 | Yamada ..................... 382/276 |
| 6,983,079 | B2 | * | 1/2006 | Kim ......................... 382/275 |

FOREIGN PATENT DOCUMENTS

| JP | 03-160273 | 7/1991 |
| JP | 04-192115 | 7/1992 |
| JP | H06-038188 | 2/1994 |
| JP | 06-230608 | 8/1994 |
| JP | 08-149470 | 6/1996 |

(Continued)

OTHER PUBLICATIONS

Ramamurthi, Bhaskar and Gersho, Allen, "Nonlinear Space-Variant Postprocessing of Block Coded Images," IEEE Transactions on Acoustics, Speech, and Signal Processing, Oct. 1, 1986, pp. 1258-1268, vol. 34, No. 5, IEEE Inc., New York, U.S.

(Continued)

*Primary Examiner*—Wenpeng Chen
*Assistant Examiner*—Yuzhen Ge
(74) *Attorney, Agent, or Firm*—Blakely, Sokoloff, Taylor & Zafman LLP

(57) ABSTRACT

An image processing apparatus and method for decompressing compressed image data is described. In one embodiment, the image processing apparatus decompresses compressed image data that is obtained by dividing an original image into blocks and compressing each block. The apparatus may comprise a decompression unit to decompress the compressed image data to provide an image which is a collection of the respective blocks, and a smoothing unit to perform a smoothing operation on the decompressed image to control the smoothing effect applied to the image based on distance from a block boundary and based on an edge amount.

11 Claims, 27 Drawing Sheets

FOREIGN PATENT DOCUMENTS

| | | |
|---|---|---|
| JP | H10-191335 | 7/1998 |
| JP | 11-285006 | 10/1999 |
| JP | 2001-257596 | 9/2001 |

OTHER PUBLICATIONS

Oguz, S.H. et al., "Image Coding Ringing Artifact Reduction Using Morphological Post-Filtering," IEEE Second Workshop on Redondo Beach, California, Dec. 7-9, 1998, pp. 628-633, Multimedia Signal Processing, 1998 Piscataway, New Jersey, U.S.

Aase, Sven O. and Ramstad, Tor A., "Ringing Reduction in Low Bit-rate Image Subband Coding Using Projection onto a Space of Paraboloids," Signal Processing Image Communication, May 1, 1993, pp. 273-282, vol. 5, No. 3, Amsterdam, NL.

Guillemaud, R., "Uniformity Correction with Homomorphic Filtering on Region of Interest," Image Processing, 1998, ICIP 98, Proceedings, 1998 International Conference on Chicago, IL, Oct. 4-7, 1998, Los Alamitos, California, IEEE Comput. Soc., Oct. 4, 1998, pp. 872-875.

European Search Report, Application No. 02028798.3, Mailed Apr. 9, 2003 (10 pages).

Rabiee, H.R. and Kashyap, R.L., "Image De-Blocking with Wavelet-Based Multiresolution Analysis and Spatially Variant OS Filters," Proceedings, International Conference on Santa Barbara, California, U.S.A., Oct. 26-29, 1997, Los Alamitos, California, U.S.A., IEEE Comput. Soc., U.S.A., Oct. 26, 1997, pp. 318-321.

Barzykina, Ekaterina and Ward, Rabab K., "Removal of Blocking Artifacts using Random Pattern Filtering," Image Processing, 1999, ICIP 99, Proceedings, 1999 International Conference on Kobe, Japan, Oct. 24-28, 1999, Piscataway, New Jersey, U.S.A., IEEE, U.S.A., Oct. 24, 1999, pp. 904-908.

Shen, Mei-Yin and Kuo, C.C. Jay, "Real-Time Compression Artifact Reduction Via Robust Nonlinear Filtering," Image Processing, 1999, ICIP 99, Proceedings, 1999 International Conference on Kobe, Japan, Oct. 24-28, 1999, Piscataway, New Jersey, U.S.A., IEEE, U.S.A., Oct. 24, 1999, pp. 565-569.

Vidaurrazaga, M. et al., "Contrast Enhancement with Wavelet Transform in Radiological Images," Proceedings, 22nd Annual EMBS Int. Conference, vol. 3, Jul. 23-28, 2000, Chicago, Illinois, pp. 1760-1763.

Kim, Nam Chul et al., "Reduction of Blocking Artifact in Block-Coded Images Using Wavelet Transform," IEEE Transactions on Circuits and Systems for Video Technology, vol. 8, No. 3, Jun. 1998, pp. 253-257.

European Search Report, Application No. 02028798.3-1247, Mailed Jul. 4, 2003 (6 pages).

Japanese Office Action for Appln. No. JP 2001-400647, mailed Feb. 22, 2007 (2 pages).

* cited by examiner

DECOMPOSITION_LEVEL_0

DECOMPOSITION_LEVEL_1

DECOMPOSITION_LEVEL_2

DECOMPOSITION_LEVEL_3

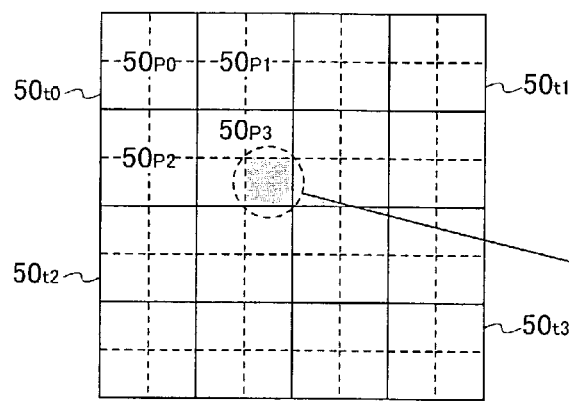

|  | | | | |
|---|---|---|---|---|
|  | -84 | -84 | -77 | -79 |
| L0 | − | − | − | − |
| L1 | 1 | 1 | 1 | 1 |
|  | 0 | 0 | 0 | 0 |
|  | 1 | 1 | 0 | 0 |
| L2 | 0 | 0 | 1 | 1 |
| L3 | 1 | 1 | 1 | 1 |
|  | 0 | 0 | 0 | 1 |
|  | 0 | 0 | 1 | 1 |

|  |  |  |  |  |
|---|---|---|---|---|
| 1 | −1 | 8 | 4 | ← COEFFICIENT |
| + | − | + | + | ← SIGN |
| 0 | 0 | 0 | 0 | (MSB) |
| 0 | 0 | 0 | 0 | |
| 0 | 0 | 0 | 0 | |
| 0 | 0 | 1 | 0 | ABSOLUE VALUE |
| 0 | 0 | 0 | 1 | |
| 0 | 0 | 0 | 0 | |
| 1 | 1 | 0 | 0 | (LSB) |

| −1 | 0 | −1 | −5 |
|---|---|---|---|
| − | 0 | − | − |
| 0 | 0 | 0 | 0 |
| 0 | 0 | 0 | 0 |
| 0 | 0 | 0 | 0 |
| 0 | 0 | 0 | 0 |
| 0 | 0 | 0 | 1 |
| 0 | 0 | 0 | 0 |
| 1 | 0 | 1 | 1 |

| 2 | 2 | 2 | 4 |
|---|---|---|---|
| + | + | − | + |
| 0 | 0 | 0 | 0 |
| 0 | 0 | 0 | 0 |
| 0 | 0 | 0 | 0 |
| 0 | 0 | 0 | 0 |
| 0 | 0 | 0 | 1 |
| 1 | 1 | 1 | 0 |
| 0 | 0 | 0 | 0 |

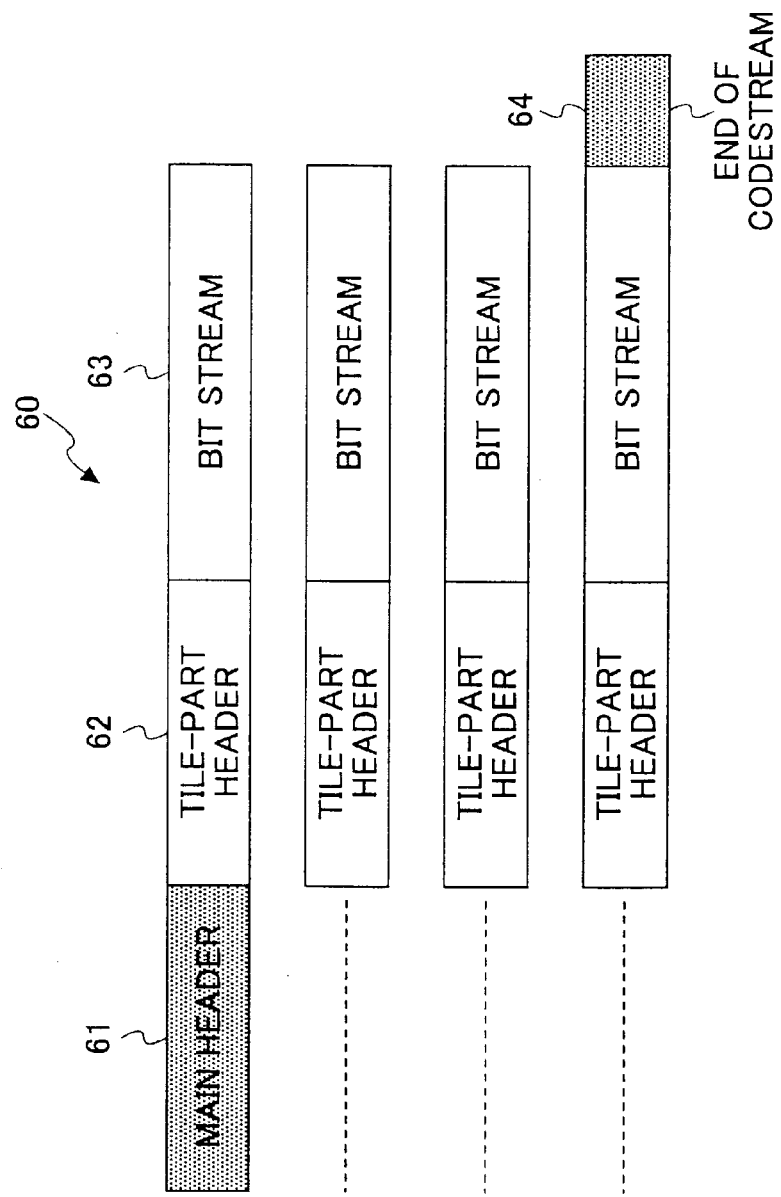

FIG.10A

| 1 | 1 | 1 | 2 | 1 | 1 | 1 |
|---|---|---|---|---|---|---|
| 0 | 1 | 2 | 6 | 2 | 1 | 0 |
| 0 | 2 | 6 | 8 | 6 | 2 | 0 |
| 0 | 1 | 2 | 6 | 2 | 1 | 0 |
| 1 | 1 | 1 | 2 | 1 | 1 | 1 |

FIG.10B

| 1 | 0 | 1 | 0 | 1 |
|---|---|---|---|---|
| 1 | 2 | 2 | 2 | 1 |
| 1 | 0 | 1 | 0 | 1 |

FIG.12A

| 1 | 1 | 1 | 2 | 1 | 1 | 1 |
|---|---|---|---|---|---|---|
| 0 | 1 | 2 | 6 | 2 | 1 | 0 |
| 0 | 2 | 6 | 36 | 6 | 2 | 0 |
| 0 | 1 | 2 | 6 | 2 | 1 | 0 |
| 1 | 1 | 1 | 2 | 1 | 1 | 1 |

FIG.12B

| 0 | 2 | 2 | 5 | 2 | 2 | 0 |
|---|---|---|---|---|---|---|
| 1 | 2 | 8 | 9 | 8 | 2 | 1 |
| 1 | 4 | 9 | 12 | 9 | 4 | 1 |
| 1 | 2 | 8 | 9 | 8 | 2 | 1 |
| 0 | 2 | 2 | 5 | 2 | 2 | 0 |

FIG.13A

|  | 35.4 | 70.7 | 106 | 141 | 177 | 212 | 247 | 283 | 318 | 354 | 389 | 424 |
|---|---|---|---|---|---|---|---|---|---|---|---|---|
|  | 25 | 50 | 75 | 100 | 125 | 150 | 175 | 200 | 225 | 250 | 275 | 300 |
| DC |  |  |  |  |  | fn/2 |  |  |  |  |  | fn (MAIN) |
| 1 | 0.96 | 0.86 | 0.72 | 0.59 | 0.49 | 0.43 | 0.42 | 0.41 | 0.41 | 0.4 | 0.4 | 0.39 |
| 0.97 | 0.93 | 0.83 | 0.71 | 0.58 | 0.49 | 0.43 | 0.41 | 0.4 | 0.4 | 0.4 | 0.39 | 0.39 |
| 0.88 | 0.85 | 0.77 | 0.67 | 0.57 | 0.48 | 0.42 | 0.39 | 0.38 | 0.38 | 0.38 | 0.38 | 0.38 |
| 0.75 | 0.73 | 0.69 | 0.62 | 0.54 | 0.47 | 0.41 | 0.37 | 0.35 | 0.35 | 0.35 | 0.36 | 0.37 |
| 0.61 | 0.6 | 0.59 | 0.56 | 0.51 | 0.45 | 0.39 | 0.34 | 0.32 | 0.31 | 0.32 | 0.34 | 0.35 |
| 0.48 | 0.49 | 0.5 | 0.5 | 0.47 | 0.43 | 0.37 | 0.32 | 0.28 | 0.28 | 0.3 | 0.32 | 0.33 |
| fn/2 = 0.39 | 0.4 | 0.42 | 0.44 | 0.43 | 0.4 | 0.35 | 0.29 | 0.26 | 0.26 | 0.27 | 0.29 | 0.3 |
| 0.35 | 0.36 | 0.38 | 0.4 | 0.4 | 0.37 | 0.33 | 0.28 | 0.25 | 0.24 | 0.26 | 0.27 | 0.28 |
| 0.35 | 0.35 | 0.36 | 0.37 | 0.36 | 0.34 | 0.3 | 0.27 | 0.25 | 0.24 | 0.25 | 0.26 | 0.26 |
| 0.38 | 0.38 | 0.37 | 0.35 | 0.33 | 0.31 | 0.29 | 0.27 | 0.26 | 0.25 | 0.25 | 0.24 | 0.24 |
| 0.43 | 0.41 | 0.38 | 0.34 | 0.3 | 0.28 | 0.27 | 0.27 | 0.27 | 0.26 | 0.25 | 0.23 | 0.23 |
| 0.46 | 0.44 | 0.4 | 0.34 | 0.29 | 0.26 | 0.26 | 0.27 | 0.28 | 0.27 | 0.25 | 0.23 | 0.22 |
| fn (SUB) = 0.48 | 0.46 | 0.4 | 0.34 | 0.28 | 0.26 | 0.26 | 0.27 | 0.28 | 0.27 | 0.25 | 0.23 | 0.22 |
| LINES/mm = 0 | 1 | 2 | 3 | 4 | 5 | 6 | 7 | 8 | 9 | 10 | 11 | 12 |

FIG.13B

|  | 35.4 | 70.7 | 106 | 141 | 177 | 212 | 247 | 283 | 318 | 354 | 389 | 424 |
|---|---|---|---|---|---|---|---|---|---|---|---|---|
|  | 25 | 50 | 75 | 100 | 125 | 150 | 175 | 200 | 225 | 250 | 275 | 300 |
| DC |  |  |  |  |  | fn/2 |  |  |  |  |  | fn (MAIN) |
| 1 | 0.95 | 0.8 | 0.6 | 0.4 | 0.23 | 0.13 | 0.07 | 0.04 | 0.03 | 0.01 | 0 | 0 |
| 0.96 | 0.9 | 0.76 | 0.57 | 0.38 | 0.22 | 0.12 | 0.06 | 0.04 | 0.02 | 0.01 | 0 | 0.01 |
| 0.83 | 0.79 | 0.66 | 0.5 | 0.33 | 0.2 | 0.11 | 0.06 | 0.03 | 0.01 | 0.01 | 0.02 | 0.03 |
| 0.66 | 0.62 | 0.52 | 0.39 | 0.26 | 0.16 | 0.09 | 0.05 | 0.02 | 0 | 0.03 | 0.05 | 0.06 |
| 0.45 | 0.43 | 0.36 | 0.27 | 0.18 | 0.11 | 0.06 | 0.03 | 0.01 | 0.02 | 0.05 | 0.07 | 0.08 |
| 0.26 | 0.25 | 0.21 | 0.15 | 0.1 | 0.06 | 0.04 | 0.02 | 0 | 0.03 | 0.06 | 0.08 | 0.09 |
| fn/2 = 0.11 | 0.1 | 0.08 | 0.06 | 0.04 | 0.02 | 0.02 | 0.01 | 0.01 | 0.03 | 0.05 | 0.07 | 0.08 |
| 0.01 | 0.01 | 0 | 0 | 0 | 0 | 0 | 0.01 | 0.02 | 0.03 | 0.04 | 0.05 | |
| 0.03 | 0.03 | 0.03 | 0.03 | 0.02 | 0.02 | 0.02 | 0.01 | 0.01 | 0 | 0 | 0 | 0 |
| 0.03 | 0.03 | 0.03 | 0.03 | 0.03 | 0.03 | 0.02 | 0.02 | 0 | 0.02 | 0.03 | 0.05 | 0.06 |
| 0.01 | 0.01 | 0.01 | 0.01 | 0.02 | 0.03 | 0.03 | 0.02 | 0 | 0.03 | 0.07 | 0.1 | 0.11 |
| 0.02 | 0.02 | 0.01 | 0 | 0.01 | 0.02 | 0.03 | 0.02 | 0.01 | 0.05 | 0.09 | 0.13 | 0.14 |
| fn (SUB) = 0.03 | 0.03 | 0.02 | 0.01 | 0.01 | 0.02 | 0.03 | 0.02 | 0.01 | 0.05 | 0.1 | 0.14 | 0.16 |
| LINES/mm = 0 | 1 | 2 | 3 | 4 | 5 | 6 | 7 | 8 | 9 | 10 | 11 | 12 |

FIG.18

TILE BOUNDARY (TILE 0) | (TILE 1)

| -1 | 0  | 0 | 0  | -1 |
|----|----|---|----|----|
| 0  | -1 | 0 | -1 | 0  |
| 0  | 0  | 8 | 0  | 0  |
| 0  | -1 | 0 | -1 | 0  |
| -1 | 0  | 0 | 0  | -1 |

| 0 | 1 | 2 | 1 | 0 |
|---|---|---|---|---|
| 1 | 2 | 4 | 2 | 1 |
| 2 | 4 | m | 4 | 2 |
| 1 | 2 | 4 | 2 | 1 |
| 0 | 1 | 2 | 1 | 0 |

TILE BOUNDARY (TILE 0) | (TILE 1)

| 2 | 1 | 0 | 0 | 1 | 2 | 3 | 4 |

| -1 | 0 | 0 | 0 | -1 |
|----|----|----|----|----|
| 0 | -1 | 0 | -1 | 0 |
| 0 | 0 | 8 | 0 | 0 |
| 0 | -1 | 0 | -1 | 0 |
| -1 | 0 | 0 | 0 | -1 |

| 0 | 1 | 2 | 1 | 0 |
|---|---|---|---|---|
| 1 | 2 | 4 | 2 | 1 |
| 2 | 4 | m | 4 | 2 |
| 1 | 2 | 4 | 2 | 1 |
| 0 | 1 | 2 | 1 | 0 |

| 1 | 2 | 4 | 2 | 1 |
|---|---|---|---|---|

(shown vertically)

FIG.30B

| 1 | 2 | 4 | 2 | 1 |
|---|---|---|---|---|

FIG.30C

|   |   | 1 |   |   |
|---|---|---|---|---|
|   |   | 2 |   |   |
| 1 | 2 | 4 | 2 | 1 |
|   |   | 2 |   |   |
|   |   | 1 |   |   |

FIG.30D

| 1 | 4 | 8 | 4 | 1 |
|---|---|---|---|---|

(shown vertically)

FIG.30E

| 1 | 4 | 8 | 4 | 1 |
|---|---|---|---|---|

FIG.30F

|   |   | 1 |   |   |
|---|---|---|---|---|
|   |   | 4 |   |   |
| 1 | 4 | 8 | 4 | 1 |
|   |   | 4 |   |   |
|   |   | 1 |   |   |

SMOOTHING TILE BOUNDARIES OF IMAGES ENCODED AND DECODED BY JPEG 2000

The present application claims priority to the corresponding Japanese Application No. 2001-400647 filed on Dec. 28, 2001 and Japanese Application No. 2002-178984 filed on Jun. 19, 2002, the entire contents of which are hereby incorporated by reference.

BACKGROUND OF THE INVENTION

1. Field of the Invention

The present invention relates to an image-processing, and, in particular, to an image processing for compression and decompression of image data in a field of a digital camera, the Internet, images for medical treatments, and images handled by satellite communications, and so forth.

2. Description of the Related Art

Along with the progress in image input technology and image output technology, a demand for achieving highly definite images has increased in recent years. For example, when, as image input apparatuses, using digital cameras as an example, cost reduction has been achieved on highly efficient charge-coupled devices (CCD) on the order of three million pixels, and thus, such high-definition image input devices are coming to be widely used in products even in a reasonable price range. Similarly, a 5 million-pixel product has also put into practical use. This tendency of increasing the number of pixels that are being handled is said to continue still for the time being.

On the other hand, high-definition image output performance and cost reduction on products providing a hard copy such as that of laser printers, ink-jet printers, sublimated printers, as well as providing a soft copy of flat-panel display devices such as CRTs, LCDs (liquid crystal display devices), PDPs (plasma display device), and so forth are being achieved. Introducing highperformance, inexpensive image input/output products increases availability of high-definition images. Thus, in various scenarios, demand for high-definition images increases. In fact, development in technology relevant to communications networks, including personal computers and the Internet is actually accelerating this trend, especially, the spread speed of mobile apparatuses, such as cellular phones and notebook-type personal computers, is very high recently, and the opportunity to transmit or receive high definition images using the communications devices from all points which is increasing rapidly.

Accordingly, it should be inevitable that the demand for image compression/decompression technology to have highly-efficient performance and multi-functions, enabling easy handling of highly definition images, will increase. JPEG2000 has been developed so as to fulfill the demand by restoring high definition images from compressed image data at a high data compression rate. In JPEG2000, generally, a given image is divided into rectangular areas (tiles), and each tile is regarded as a basic unit when performing the data compression/decompression process. Therefore, compression/decompression operation is performed for every tile individually. In this case, when compression/decompression processing is performed with a high rate of compression, a problem occurs in that "the boundary of a tile" becomes noticeable in a decompressed restored image. In order to solve this problem, making a boundary overlap mutually with adjoining tiles has been proposed. However, according to the base line of JPEG2000, overlapping of adjacent tiles is not allowed.

According to another proposal, a lowpass filter may be applied around a tile boundary so as to prevent the tile boundary from becoming noticeable. Although this scheme may be effective to reduce a tile boundary distortion, another problem may occur in that an edge is inevitably faded near the tile boundary and a belt shaped zone of image quality degradation may occur there.

For example, according to an image coding apparatus and an image decoding apparatus disclosed by Japanese laid-open patent No. 11-285006, tile circumference data is obtained by extrapolation at a time of applying a wavelet transform, management information is created, and it is attached to code data. Then, the code data is decoded with reference to the management information at a time of performing the decoding operation. In this scheme, extra data should be attached to the code data.

According to a method of reducing block distortion at the time of decoding image data obtained through transform coding and a transformed image data decoding apparatus disclosed in Japanese patent No. 2940422, a lowpass filter is applied in an adaptive way in accordance with quantization degree in an adjacent block.

According to Japanese laid-open patent application No. 05-014735 (image-processing apparatus), a block boundary is determined, and, an even smoothing filter is applied to the determined block boundary.

The above-mentioned prior art may not necessarily be sufficient in effectively achieve a block boundary distortion.

SUMMARY OF THE INVENTION

An image processing apparatus and method for decompressing compressed image data is described. In one embodiment, the image processing apparatus decompresses compressed image data that is obtained by dividing an original image into blocks and compressing each block. The apparatus may comprise a decompression unit to decompress the compressed image data to provide an image which is a collection of the respective blocks, and a smoothing unit to perform a smoothing operation on the decompressed image to control the smoothing effect applied to the image based on distance from a block boundary and based on an edge amount.

BRIEF DESCRIPTION OF THE DRAWINGS

Other features of the present invention will become more apparent from the following detailed description when read in conjunction with the accompanying drawings.

FIGS. 5A through 5G illustrate an exemplary process of giving an order to bit planes;

FIG. 6 shows an example of the structure of a code stream briefly;

FIGS. 10A and 10B show an example of lowpass filters having different mask sizes that are selectable according to the number of levels of wavelet transform, according to one embodiment of the present invention;

FIGS. 12A and 12B show an example of different lowpass filters that are selectable according to the rate of compression applied, according to one embodiment of the present invention;

FIGS. 13A and 13B show frequency characteristics of the lowpass filters shown in FIGS. 12A and 12B;

FIG. 18 illustrates an exemplary calculation technique to calculate the distance from a tile boundary according to one embodiment of the present invention;

FIG. 27 illustrates a calculation technique for calculating the distance from a tile boundary according to one embodiment of the present invention;

FIGS. 28A through 28C illustrate lowpass filter control according to the distance from a tile boundary according to one embodiment of the present invention;

FIGS. 30A through 30F illustrate lowpass filter control according to the rate of compression, according to one embodiment of the present invention.

DETAILED DESCRIPTION

Embodiments of the present invention have been devised in consideration of the current situation described above and aim at effectively reducing tile boundary distortion from a decompressed image.

In order to reduce the boundary distortion, according to one embodiment of the present invention, when decompressing compressed image data that is obtained from first dividing (spatially) an original image into blocks, and compressing each block, a decompression process is used to decompress the compressed image data and provide an image which is a collection of the respective blocks connected together by block boundaries. Then a smoothing unit performs a smoothing operation on the decompressed image, thereby applying a smoothing effect to the image, which is controlled based on a distance from a block boundary and based on an edge amount.

As the smoothing effect is controlled according to the distance from the block boundary, it becomes possible to control the smoothing effect to have a stronger effect only near the block boundary, and the smoothing effect is gradually reduced farther from the block boundary.

Furthermore, as the smoothing effect is controlled according to an edge amount, it becomes possible to prevent an edge portion on an original image from being reduced in its impact resulting in the restored image being blurred, while the block boundary can be effectively made unnoticeable.

Figure 1:
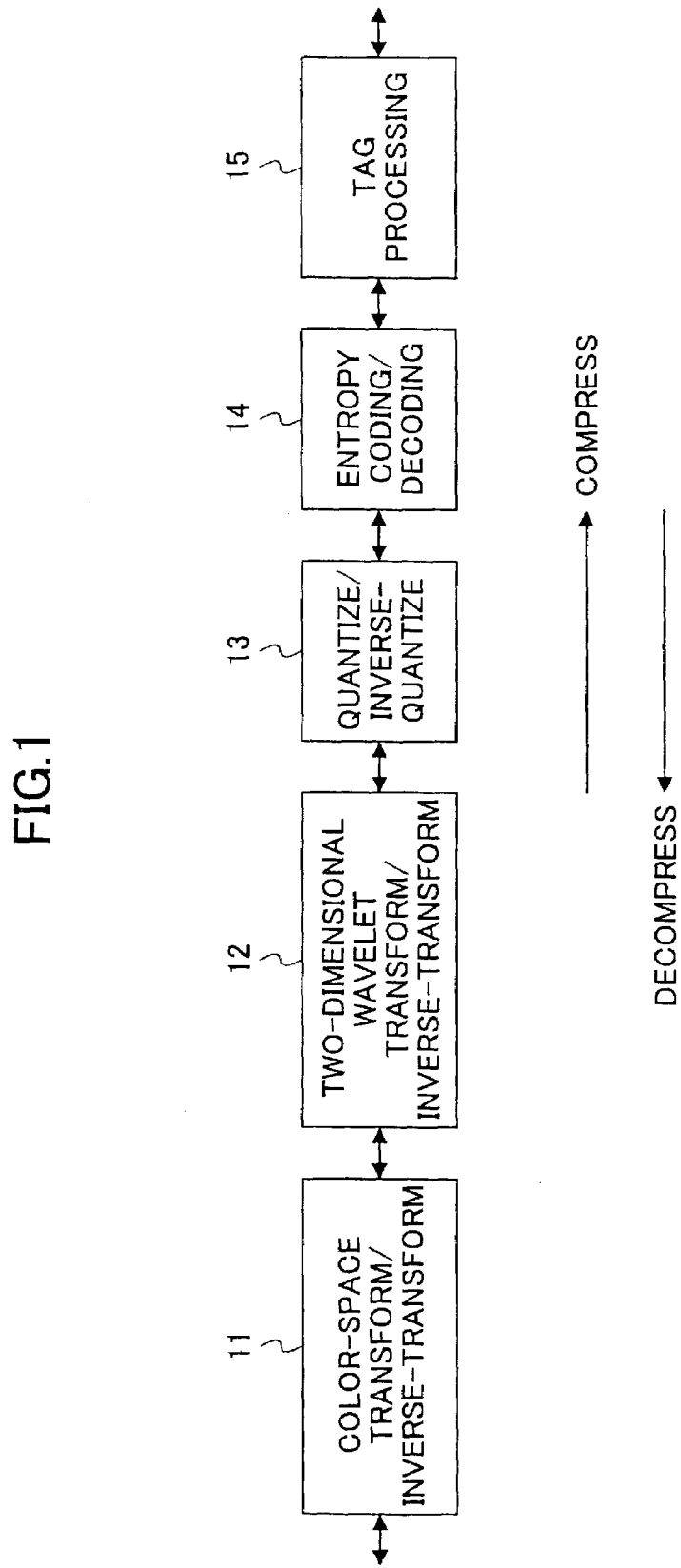
FIG. 1 shows a block diagram illustrating the encoding and decoding of JPEG2000.

FIG. 1 shows a block diagram illustrating basic encoding and decoding functions according to the JPEG2000 scheme. As shown, the encoding and decoding functions and of JPEG2000 includes a color-space transform/inverse-transform unit 11, a two-dimensional wavelet transform/inverse-transform unit 12, a quantization/inverse-quantization unit 13, an entropy coding/decoding unit 14, and a tag processing unit 15.

Figure 2:
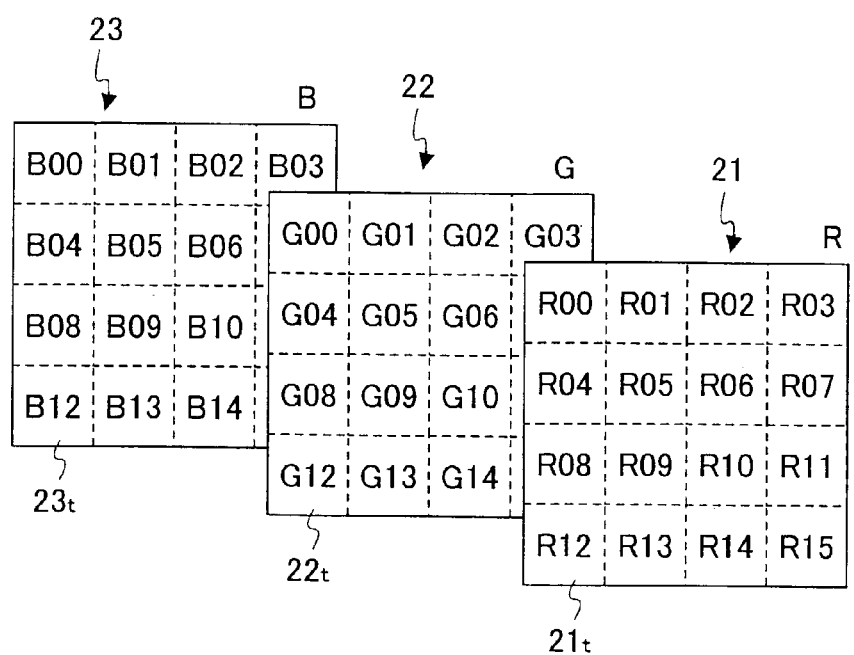
FIG. 2 shows an example of respective color-space components of a color image divided into tiles according to JPEG2000.

FIG. 2 shows art example of each color-space component of a color image divided into tiles. Generally, a color image is divided into rectangular areas called tiles 21W, 22W, and 23W for every color-space component 21, 22 or 23, as shown in FIG. 2. In this example, the color space of the original image is the RGB primary color space. Each tile, R00, R01, . . . , R15/G00, G01, . . . , G15/B00, B01, . . . , B15, is regarded as a basic unit operated on during an image data compression/decompression process. Thus, in one embodiment, image data compression/decompression operation is performed individually for every color-space component and every tile.

After the data of each tile of each component is input into the color-space transform unit 11 shown in FIG. 1 and after color-space transform is performed thereby, a two-dimensional wavelet transform (order alteration) is performed by the two-dimensional wavelet transform unit 12. Thus, a spatial division operation is performed on the data, thereby converting into frequency bands.

Figure 3A:
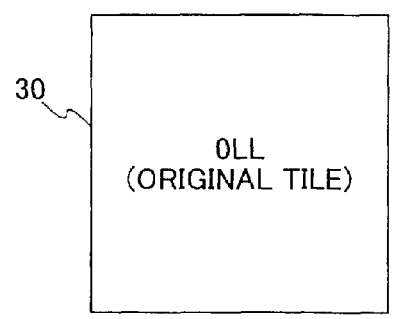
FIGS. 3A through 3D show an example of subbands in each decomposition level for three decomposition levels according to JPEG2000.
Figure 3B:
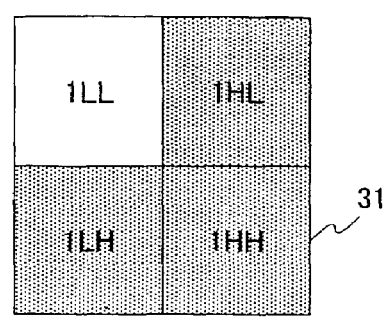
Figure 3C:
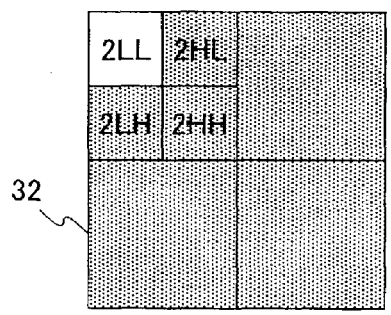
Figure 3D:
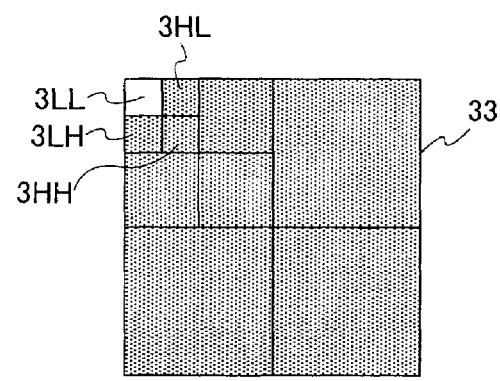

FIGS. 3A through 3D illustrate an exemplary subband in each decomposition level for three decomposition levels. As shown in FIGS. 3A–3D, a tile original image (0LL) (decomposition level 0 (30)) obtained through the tile division from the original image shown in FIG. 3A is divided into subbands (1LL, 1HL, 1LH, 1HH) on first decomposition level (31) as shown in FIG. 3B through the two-dimensional wavelet transform process. Then, similarly, a two-dimensional wavelet transform is performed on the low-frequency subband 2LL on the second decomposition level and is divided into subbands (2LL, 2HL, 2LH, 2HH) on the second decomposition level (32) as shown in FIG. 3C. Then, similarly, a two-dimensional wavelet transform is performed on the low-frequency subband 2LL on the second decomposition level and is divided into subbands (3LL, 3HL, 3LH, 3HH) on the third decomposition level (33) as shown in FIG. 3D.

Subsequently, a bit to be coded is selected sequentially from the obtained wavelet coefficients, and, a context is created therefore from peripheral bits in the quantization unit 13 shown in FIG. 1. The wavelet coefficients which have undergone the quantization operation are divided into rectangles called "precincts" for each subband.

Figure 4:
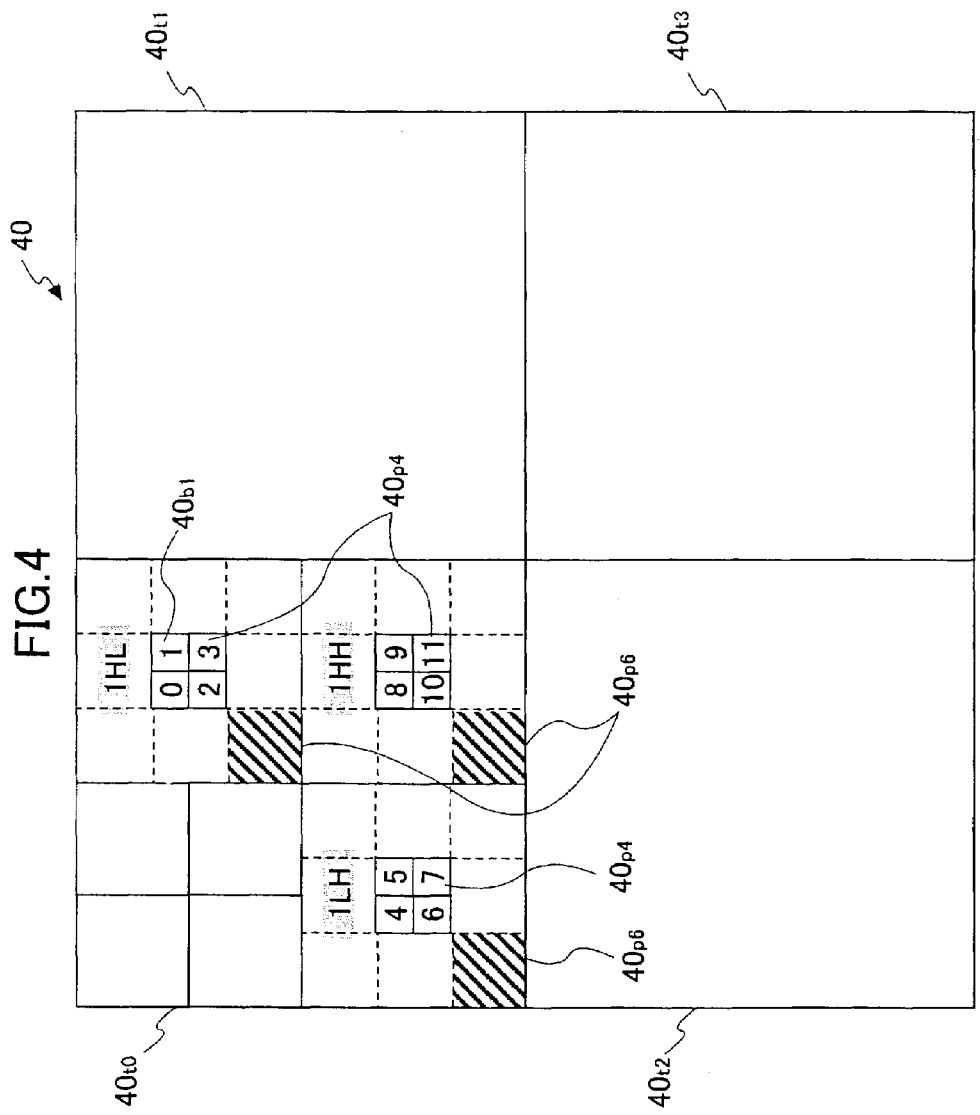
FIG. 4 illustrates an example of a relation between precincts and code blocks according to the standard JPEG scheme.

FIG. 4 illustrates an example of a relationship between precincts and code blocks. In this example, an original image 40 is divided into four tiles, i.e., a tile 40Wt0, a tile 40Wt1, a tile 40Wt2, and a tile 40Wt3, on a first (1) decomposition level. As shown in FIG. 4, one precinct 40p4 includes three rectangle areas coincident in spatial position. The same is applied to the precinct 40p6. Furthermore, each precinct is divided into rectangular "code blocks". In this example, a precinct is divided into 12 code blocks numbered as 0 through 11. These code blocks are regarded as basic units at a time of the entropy coding operation.

It is possible to directly quantize the wavelet coefficients. However, according to JPEG2000, in order to improve the coding efficiency, each coefficient value is decomposed into bit-planeunits. Then, after that, the bit planes are ordered according to every code block or every pixel. FIGS. 5A through 5G illustrate a scheme of ordering the bit planes. In this example, an original image 50 of 32×32 pixels is divided into a tile 50t0, a tile 50t1, a tile 50t2, and a tile 50t3, each including 16×16 pixels, as shown in FIG. 5A. In this case, each precinct and each code block on the first (1) decomposition level have sizes of 8×8 pixels and 4×4 pixels, respectively.

The number of each precinct and the number of each code block are given in raster order. For example, the precincts are given the numbers 0–3 (for example, 50p0 through 50p3, shown in FIG. 5A), and the code blocks are given the numbers 0–3 (for example, 50b0 through 50b3, shown in FIG. 5B). The mirroring technique (described later) is applied to increase the number of pixels on the outside of a tile boundary, a reversible (5, 3) filter is applied for the wavelet transform, and thus, wavelet coefficient values on the first (1) decomposition level are calculated.

Moreover, a conceptual scheme of an example of typical "layer" configuration is shown in FIGS. 5D through 5G on the tile 50t0 (tile 0)/precinct 50p3 (precinct 3)/code block 50b3 (code block 3) as shown in FIG. 5B. The code block 50w3 obtained after the wavelet transform from the pixel values shown in FIG. 5B is divided into subbands (1LL, 1HL, 1LH, 1HH), and the wavelet coefficient values are obtained on each subband, as shown in FIG. 5C. As shown in FIGS. 5D through 5G, each layer L0 through L3 includes one or multiple bit planes. In this example, layers L0, L1, L2, and L3 include 1, 3, 1 and 3 bit planes, respectively. In one embodiment, a layer including bit plains nearer to the LSB is quantized earlier so as to be likely to be deleted first, while a layer nearer to the MSB is quantized later so as to be likely to remain longer. The scheme of deleting the layers nearer to the LSB first is called truncation. By applying such a scheme, it becomes possible to finely control the quantization rate.

The entropy coding unit 14 shown in FIG. 1 performs probability estimation so as to obtain code data from the target bit and the context thereof, thus, performing coding on the tile of each component. In this way, coding processing is performed per tile on every component of the original image.

Finally, the tag processing unit 15 connects all the code data obtained from the entropy coding unit 14 together, and attaches predetermined tags thereto. FIG. 6 shows an example of a typical structure of a code stream obtained, briefly. As shown, tag information called headers (respectively a main header 61, and tile part headers 62, as shown) is added to the head of the code stream 60, and the head of each of tile parts of respective tiles, followed by the code data (bit streams 63) of each tile. Then, a tag is attached to the tail 64 of the code stream 60. The header information thus includes information indicating the position of each tile boundary.

On the other hand, at a time of decoding, the original image data is restored from the above-mentioned code stream for each tile of each component, in the inverse process from that of the coding process described above. In this case, the tag processing unit 15 interprets the tag information attached to the code stream input from the exterior, the code stream is decomposed into code streams of respective tiles of each component, and decode processing is performed for every code stream of each tile of each component, while positions of each bit to be decoded are determined according to the order based on the tag information in the code stream, and, also, the context is produced for the bit in the inverse quantization unit 13 from the periphery bits thereof (decoding thereof has been already completed). In the entropy decoding unit 14, decoding is performed in a probability estimation manner from the context and the code stream. In doing so, the target bit is restored and, then, is written in the determined position.

The obtained decoded data is spatially divided into the respective frequency bands. Then, therefrom, each tile of each component of image data is restored by performing a two-dimensional wavelet inverse transform in the two-dimensional wavelet inverse transform unit 12. The restored data is transformed into data of the original primary color system by the color space inverse transform unit 11.

In a case the conventional JPEG compressing/decompression scheme is applied instead of JPEG2000, each tile is replaced by a square block having 8 pixels on each side to undergo two-dimensional discrete cosine transform.

Figure 7:
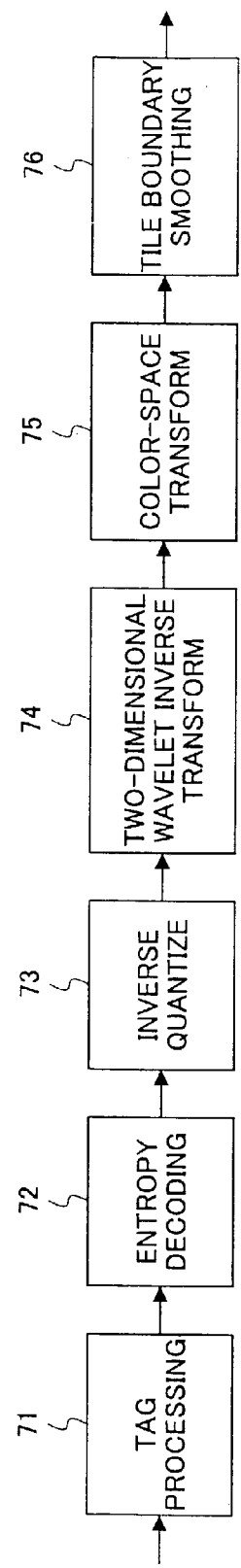
FIG. 7 shows a block diagram illustrating an example of an image decompression unit according to one embodiment of the present invention.
Figure 8:
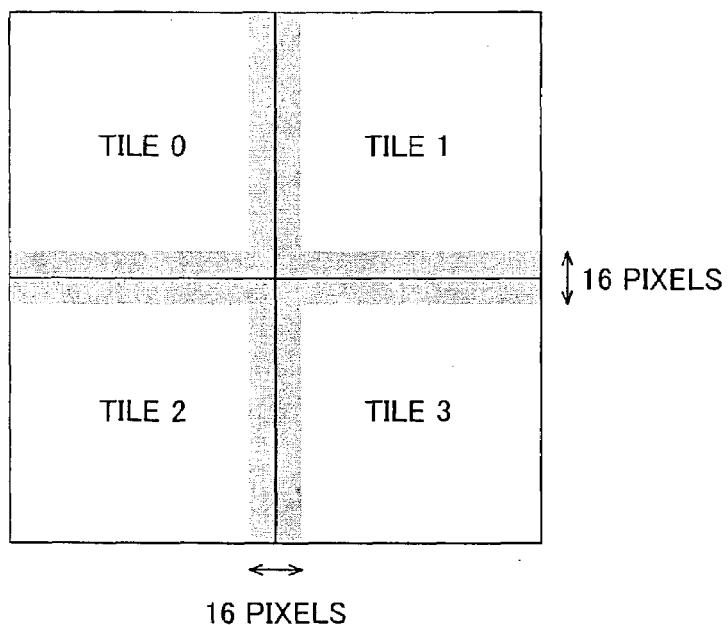
FIG. 8 shows an example of processing in a tile boundary smoothing unit using a wavelet transform of levels according to one embodiment of the present invention.
Figure 9:
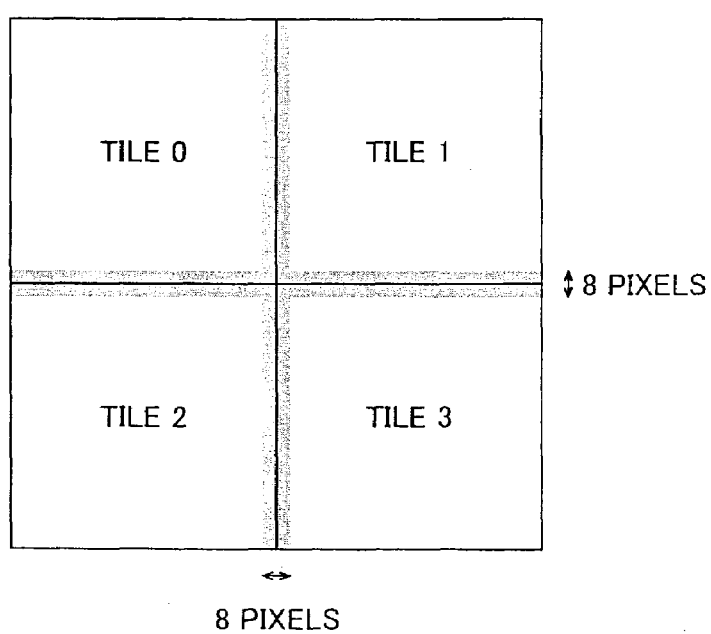
FIG. 9 shows an example of processing in the tile boundary smoothing unit when two levels of using wavelet transform according to one embodiment of the present invention.

FIG. 7 shows a block diagram illustrating an exemplary image decompression unit in a first embodiment of the present invention. As shown, this unit includes a tag processing unit 71, an entropy decoding unit 72, an inverse quantization unit 73, a two-dimensional wavelet inverse transform unit 74, a color space inverse transform unit 75, and a tile boundary smoothing unit 76. According to this embodiment, on RGB data obtained through the color space inverse transform unit 75, pixel values near a tile boundary are smoothed so that a distortion occurring there is made inconspicuous by the tile boundary smoothing unit 76. With reference to FIGS. 8 and 9, specific examples of operations performed by the tile boundary smoothing unit 76 will now be described.

FIG. 8 shows an example of processing performed by the tile boundary smoothing unit 76 in the case where three levels of the wavelet transform are applied. In the example shown in FIG. 8, data coded using three levels of the wavelet transform is such that pixels near the tile boundary, in particular, 8 pixels counted from the tile boundary, are influenced by the coding distortion according to the JPEG2000 standard. Accordingly, in this embodiment of the present invention, a lowpass filter is applied to the 8 pixels (total 16 pixels on both ends) counted from the tile boundary including the pixels right on the tile boundary as shown in FIG. 8 so as to eliminate the influence of the coding distortion (caused by the above-mentioned mirroring operation, or the like).

FIG. 9 shows an example of processing performed by the tile boundary smoothing unit 76 in case where two levels of the wavelet transform are applied. In the example shown in FIG. 9, data coded from two levels of the wavelet transform is such that pixels near the tile boundary, in particular, 4 pixels counted from the tile boundary, are influenced by coding distortion according to the JPEG2000 standard. Accordingly, in this embodiment of the present invention, a lowpass filter is applied to the 4 pixels (total 8 pixels on both ends) counted from the tile boundary including the pixels right on the tile boundary as shown in FIG. 9 so as to eliminate the influence of coding distortion.

Thus, as to data coded from applying n levels of wavelet transform (decomposition levels, described above with reference to FIGS. 3A through 3D), a lowpass filter should be applied to pixels in a range through the n-th power of 2 of pixels counted from the tile boundary.

Thus, according to one embodiment of the present invention, the range to which a low pass filter is applied is selected according to the number of wavelet-transform decomposition levels applied. However, the range of pixels counted from the tile boundary through which a low pass filter is applied may be adjusted in terms of the balance of the required costs, the required processing time, and the image quality obtained therefrom.

Furthermore, it is possible to apply a scheme in which the lowpass filter to be applied is switched based on the wavelet transform method applied. For example, there are various types of wavelet transform methods applying a 5×3 filter, a 9×7 filters, and so forth. Then, lowpass filters having different frequency characteristics may be selectively applied for the cases of applying these respective types of wavelet transform methods.

Thus, according to one embodiment of the present invention, it becomes possible to effectively reduce the adverse influence of coding distortion occurring around the tile boundary by applying a lowpass filter, and, also, it becomes possible to select the range through which the lowpass filter is applied according to various conditions.

Another embodiment of the present invention will now be described. FIGS. 10A and 10B show an example of a lowpass filter having variable mask with sizes varying according to the number of decomposition levels of wavelet transform applied. In this embodiment, as shown in FIGS. 10A and 10B, the mask size of the lowpass filter can be switched between two sizes shown in FIGS. 10A and 10B, for example. For example, on code data obtained using five levels of wavelet transform, as shown in FIG. 10A, a 7×5-size mask is applied. On the other hand, on code data obtained using three levels of wavelet transform, as shown in FIG. 10B, a 5×3-size mask is applied. In this embodiment, the size of the mask is increased as the number of levels of the wavelet transform applied is increased. This is because, as mentioned above, as the number of pixels around the tile boundary adversely affected by the mirroring operation according to wavelet-transform coding of JPEG2000 increases, the number of levels of the wavelet transform applied increases. Here, the mask sizes illustrated above in this embodiment are merely examples, and, the actual mask size may be appropriately determined such that the tile boundary distortion may be effectively reduced thereby.

Figure 11:
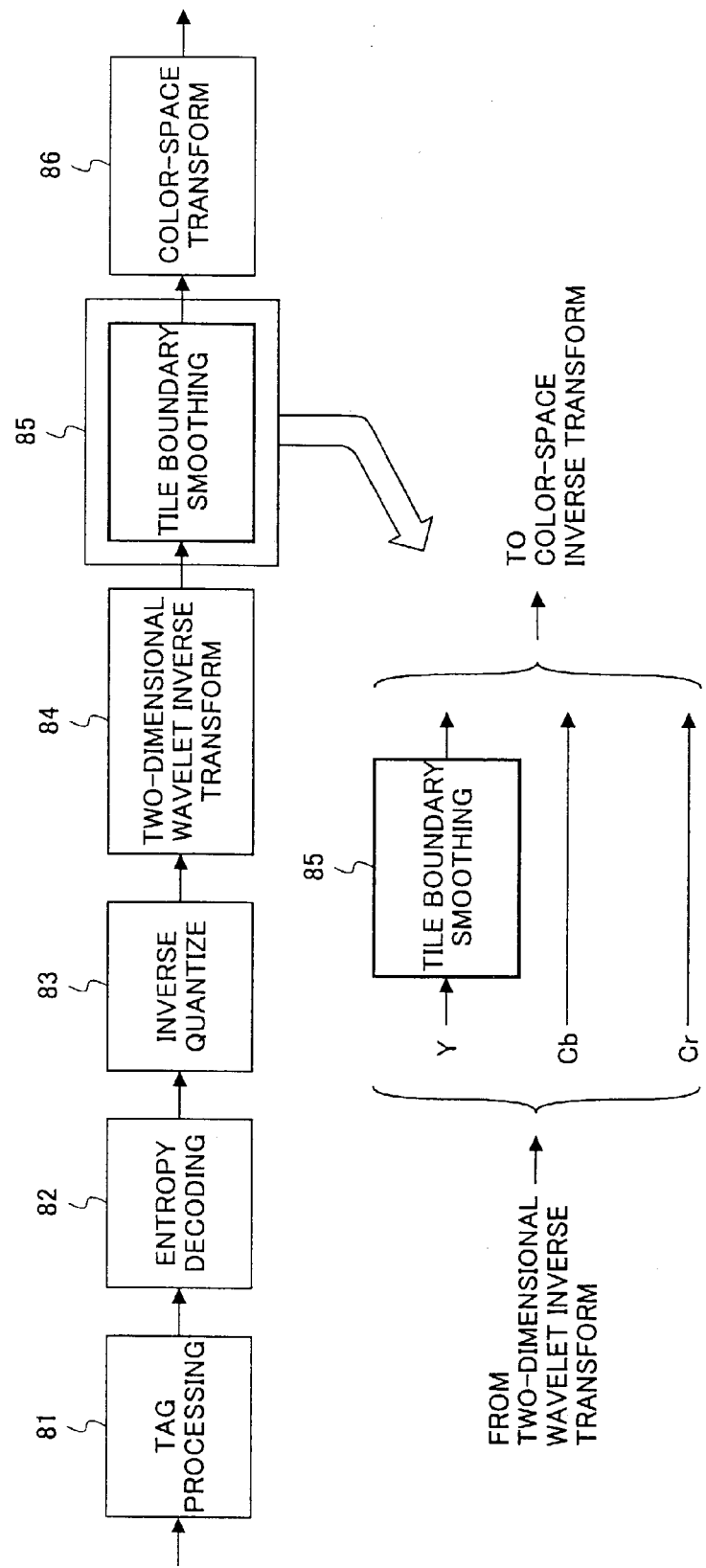
FIG. 11 shows a block diagram illustrating another example of an image decompression unit according to one embodiment of the present invention.

Still another embodiment of the present invention will now be described. FIG. 11 is a block diagram illustrating an image decompression unit according to another embodiment of the present invention. As shown, this unit includes a tag processing unit 81, an entropy decoding unit 82, an inverse quantization unit 83, a two-dimensional wavelet inverse transform unit 84, a tile boundary smoothing unit 85, and color-space inverse transform unit 86. In this embodiment, a lowpass filter is applied near a tile boundary on an YCbCr signal before the signal is transformed into a RGB signal.

In this case, the lowpass filter is applied only to the luminosity signal component Y, but is not applied to the other Cb and Cr signal components. This is because, generally speaking, the above-mentioned tile distortion or coding distortion occurring around tile boundary depends largely on the luminosity signal Y. As not all of the color-space components of the image signal have the lowpass filter applied thereto (different from the above-described first and second embodiments), a reduction in required data processing time can be achieved according to this embodiment.

However, according to this embodiment, as only the luminosity has the lowpass filter applied for the purpose of tile boundary distortion control, it may not be possible to maintain the continuity sufficiently in color at the tile boundary. Accordingly, it is also possible to apply the lowpass filter to all the color-space components of the YcbCr signal or all the color-space components of the RGB data after having undergone the color-space inverse transform, for the purpose of achieving higher-performance tile boundary distortion control. Furthermore, it is also possible to selectively apply lowpass filters having different frequency characteristic on the respective ones of Y, and Cb; or Cr, G, R and B.

According to the embodiments of the present invention described above, it becomes possible to control or effectively reduce the tile boundary distortion by applying the lowpass filter near the tile boundary, and, also, to effectively reduce the time required for the decoding process. Moreover, it also becomes possible to realize quality improvement in the resulting decoded image.

FIGS. 12A and 12B illustrate a lowpass filter used in the tile boundary smoothing unit according to another embodiment of the present invention in which the filter characteristics vary according to the rate of data compression in the wavelet coding. In this embodiment, the intensity of the lowpass filter is made variable according to the rate of data compression.

Generally, the tile boundary distortion is more noticeable for an image having undergone with the higher rate of data compression. Therefore, if a lowpass filter having a strong smoothing effect is applied to an image having undergone a relatively low rate of compression, the relevant portion may become faint, and, as a result, the relevant position may become rather noticeable. On the contrary, if a lowpass filter having a low smoothing effect is applied to an image having undergone a higher rate of compression, it becomes difficult to acquire the expected effect of tile boundary distortion control.

For this reason, as shown in FIGS. 12A and 12B, according to the rate of data compression which a relevant image has undergone at a time of coding, the smoothing effect of the lowpass filter applied at a time of decoding is switched between those shown in these figures. For example, in a case of a relevant image has undergone image data compression of the compression rate of 1/20 in the coding process, a lowpass filter as shown in FIG. 12A is applied. In a case of a compression rate 1/40 is applied in the coding process, a lowpass filter as shown in FIG. 12B is applied.

As can be seen from these figures, as the filter of FIG. 12A has a very large value at the center and has very small values at the periphery, this filter has a small smoothing effect since the value of the target pixel depends on the same pixel itself mainly. On the other hand, as the filter of FIG. 12B does not have a very large value at the center and does not have very small values at the periphery, i.e., all the values are rather even, this filter has a large smoothing effect since the value of the target pixel depends on not only the same pixel itself but also the peripheral pixels at similar rates.

FIGS. 13A and 13B show the frequency characteristics of the respective lowpass filters shown in FIGS. 12A and 12B. Since the value shown in FIG. 13A for every frequency band and every direction is larger than the corresponding value shown in FIG. 13B, it can be said that the lowpass filter of FIG. 12A has a weaker smoothing effect in comparison to the filter of FIG. 12B.

Thus, according to this embodiment of the present invention, the tile boundary distortion can be well controlled by applying the lowpass filter near the tile boundary. Also, in the case that any rate of data compression is applied in the coding process, the tile boundary distortion control can be effectively achieved as a result of applying the lowpass filter of the more optimum smoothing effect in decoding process according to the rate of data compression applied in the coding process.

Figure 14:
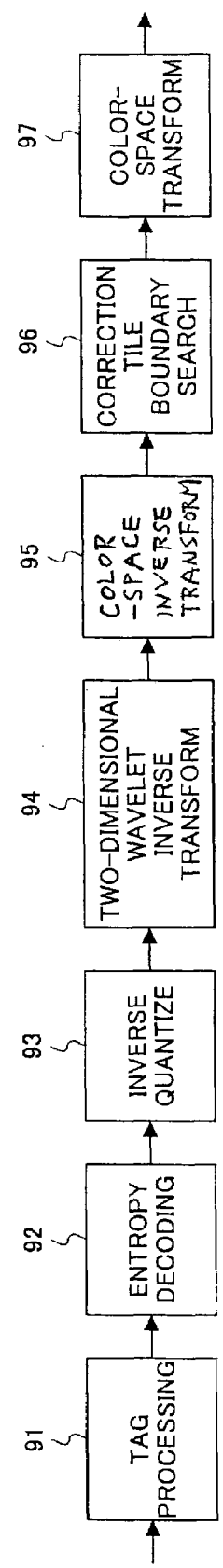
FIG. 14 shows a block diagram illustrating another example of an image decompression unit according to one embodiment of the present invention.

FIG. 14 illustrates an image decompression unit according to still another embodiment of the present invention. As shown, this unit includes a tag processing unit 91, an entropy decoding unit 92, an inverse quantization unit 93, a two-dimensional wavelet inverse transform unit 94, a tile boundary smoothing unit 95, and a color-space inverse transform unit 96, and a correction tile boundary search unit 97. According to this embodiment, not all the tile boundaries undergo tile boundary distortion control processing by using a lowpass filter. Instead, the lowpass filter is applied only on tile boundaries within a specific zone determined. FIGS. 15A, 15B, 16A and 16C show examples of defining tile boundaries to undergo tile boundary distortion control processing according to this embodiment.

FIGS. 15A, 15B and FIGS. 16A, 16B illustrate examples of selection of the tile boundaries included in predetermined ROI (Region of Interest) areas. The ROI area is a certain area of a relevant image which is in particular extracted from the entire image, and specifically undergoes a predetermined processing such as magnification, predetermined enhancement, or the like.

Figure 15A:
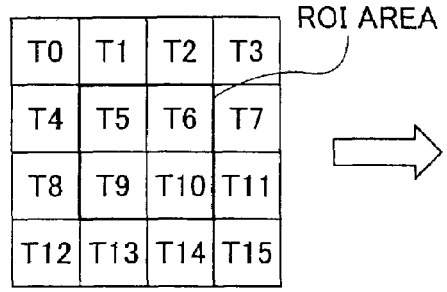
FIGS. 15A, 15B, 16A and 16B illustrate examples of the results of applying a lowpass filter only to tile boundaries in ROI areas, according to one embodiment of the present invention.
Figure 15B:
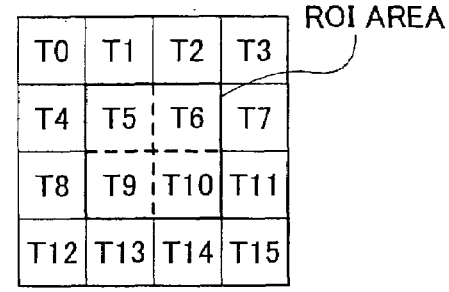

FIG. 15A shows an example in which the ROI area is defined along the tile boundaries. In this case, the tile boundaries set to have a lowpass filter applied thereto are these indicated by broken lines in FIG. 15B. In this case, a lowpass filter is not applied to the ROI boundaries themselves indicated by thick lines in FIG. 15B.

Figure 16A:
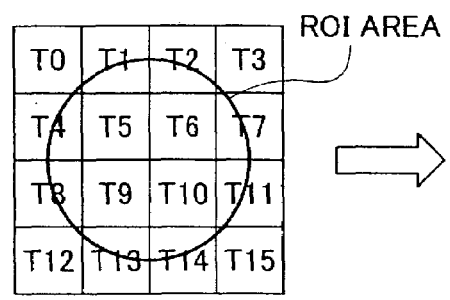
Figure 16B:
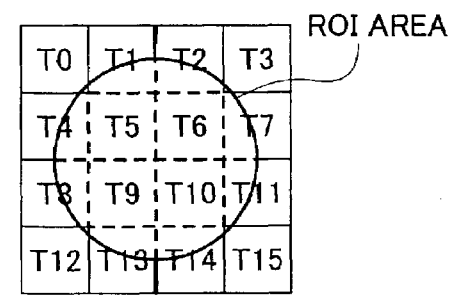

FIG. 16A shows an example where the ROI area is not defined right along the tile boundaries. In case the ROI boundary is set as shown in FIG. 16A, the tile boundaries set to have a lowpass filter applied thereto are those indicated by broken lines shown in FIG. 16B. In this case, the operation is performed to determine whether or not each tile boundary pixel (pixel on or around the tile boundary) is included in the ROI area. Then, in case the relevant pixel is determined as being included in the ROI area, it has the lowpass filter applied thereto. When the pixel is not included in the ROI area, no lowpass filter is applied thereto.

According to this embodiment described above, it is determined whether a lowpass filter should be applied by determining whether a relevant tile boundary pixel is included a predetermined ROI area. However, other than this, it is also possible that a lowpass filter is applied only to a tile boundary pixel included in pixels forming a vertical or horizontal edge in an original image. According to this scheme, tile boundary pixels that are to undergo the tile boundary distortion control processing are adaptively controlled. Thereby, it becomes possible that only tile boundary pixels included in a predetermined ROI area should have a lowpass filter applied thereto. It is noted that, throughout the specification of the present application, the term 'tile boundary pixel' means a pixel right along a tile boundary or a pixel around the tile boundary. Thereby, the processing time required for the tile boundary distortion control can be effectively reduced as the pixels to undergo the control can thus be limited.

Figure 17:
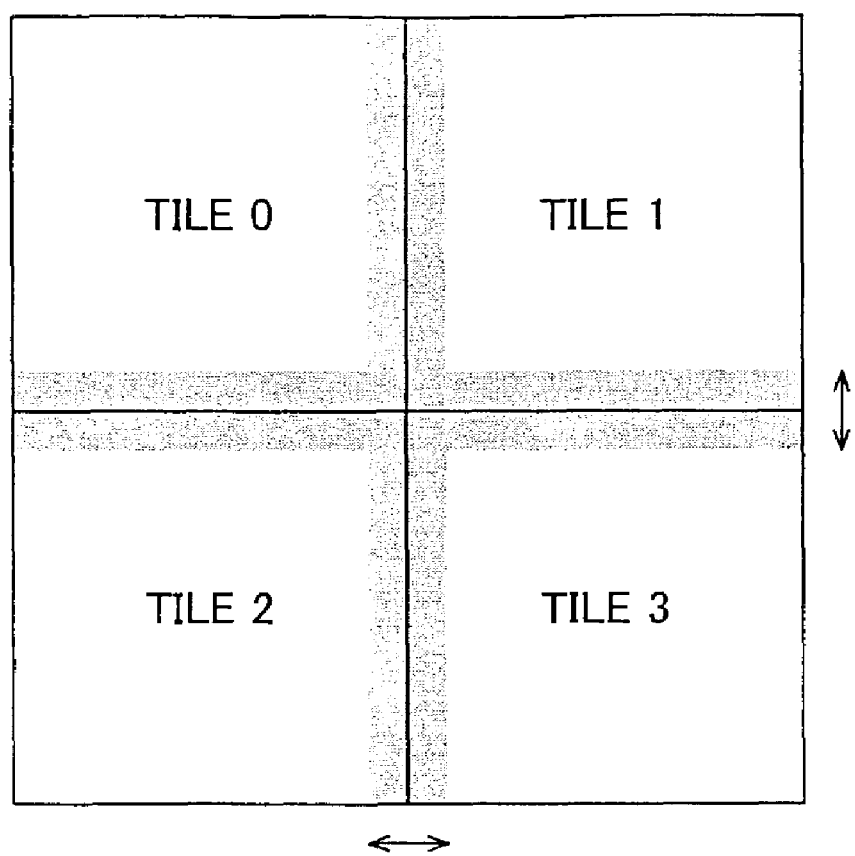
FIG. 17 illustrates an example of processing in a tile boundary smoothing unit according to one embodiment of the present invention.

FIG. 17 illustrates an example of processing of tile boundary smoothing according to another embodiment of the present invention. In this example, it is assumed that the lowpass filter is applied to pixels near the tile boundaries (pixels of areas indicated by halftone dots or gray painted in FIG. 17).

Figure 18:
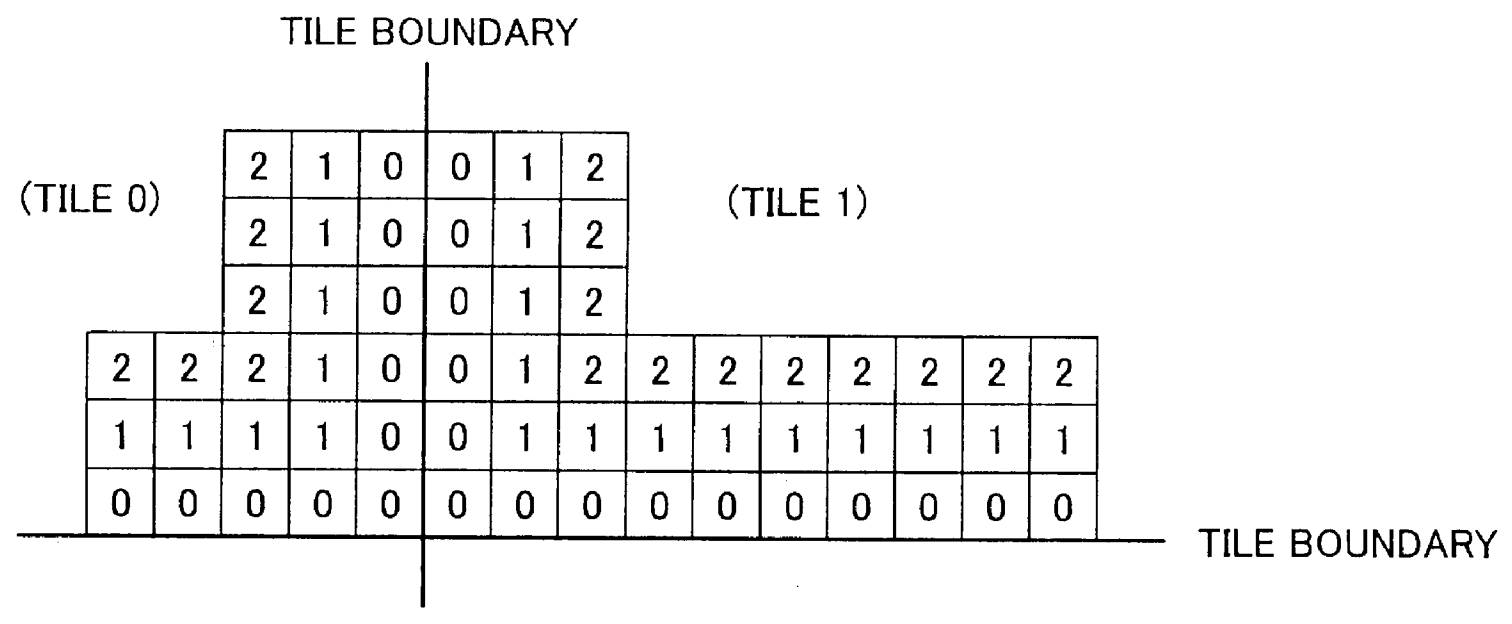

FIG. 18 illustrates an exemplary calculation of a distance of each pixel from a relevant tile boundary. In each pixel shown in FIG. 18, the distance from the tile boundary in the four directions is calculated first. Then, the minimum value thereof is determined as the final distance from the tile boundary on the relevant pixel. The numerals indicated in FIG. 18 show the distances of the respective pixels determined.

Figures 19A, 19B, 20A, 20B:
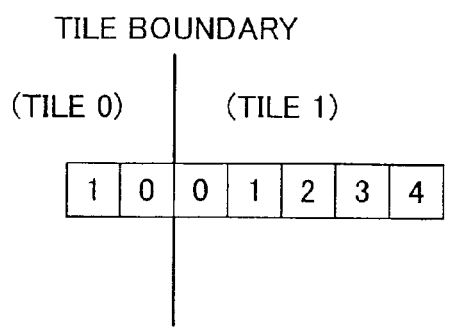
FIGS. 19A and 19B illustrate exemplary adaptive lowpass filter processing using the distance from a tile boundary, according to one embodiment of the present invention.
FIGS. 20A and 20B show exemplary lowpass filters selectable according to the rate of compression applied, according to one embodiment of the present invention.

FIGS. 19A and 19B illustrate exemplary adaptive-lowpass filter processing according to another embodiment of the present invention, which uses the distance of each pixel from a tile boundary. FIG. 19A shows the distance of each pixel from the tile boundary. FIG. 19B shows an example of the adaptive-lowpass filter in this embodiment. In this embodiment, the coefficient 'm' in the lowpass filter at the position to be applied to a target pixel is altered/adjusted. Specifically, the value of the coefficient 'm' is gradually enlarged as the distance of the target pixel from the tile boundary becomes larger. Thus, the smoothing effect being reduced. In the example shown in FIG. 19B, the central coefficient value 'm' is calculated by the following formula (1).

$$m = 8 + 64 \times d \qquad (1)$$

where 'd' denotes the distance of the target pixel from the tile boundary. This means that the smoothing effect of the lowpass filter is made weaker as the distance of the target pixel from the tile boundary becomes larger.

Moreover, according to the image-processing apparatus in this embodiment of the present invention, a threshold in distance of the target pixel from the tile boundary by which it is determined whether or not the lowpass filter is applied to the target pixel may be controlled according to the number of decomposition levels of the wavelet transform applied in the coding process. For example, as mentioned above, as for data coded obtained using three levels of the wavelet transform, 8 pixels (16 pixels on both sides) from the tile boundary are influenced by the mirroring operation according to the wavelet coding. For this reason, the lowpass filter should be applied to these 8 pixels (16 pixels on both sides) from the tile boundary as shown in FIG. 8. As for the data coded obtained using two levels of the wavelet transform, 4 pixels from the tile boundary (8 pixels on both sides) are influenced by the mirroring, in another example. For this reason, in this example, the lowpass filter should be applied to these 4 pixels (8 pixels on both sides) from the tile boundary as shown in FIG. 9. That is, as for data coded obtained using n levels of wavelet transform, the lowpass filter should be applied to the n-th power of 2 of pixels from the tile boundary. Accordingly, the threshold for determining whether or not the target pixel should have the lowpass filter applied thereto may be controlled adaptively according to the number of levels of wavelet transform applied in the coding process, in the above-described way.

Moreover, it is also possible to adjust the distance of the target pixel from the tile boundary within which distance the lowpass filter is applied to the target pixel, in terms of the cost and processing time required, and resulting image quality demanded. Furthermore, the lowpass filter applied may be switched according to the specific type of wavelet transform applied. For example, there are various types of wavelet transform employing a 5×3 filter, a 9×7 filter, and so forth. Then, it is possible to apply the lowpass filter having the frequency characteristic which differs according to the specific one of these different types of wavelet transform applied in the coding process.

Moreover, as shown in FIGS. 10A and 10B, the mask size of the lowpass filter applied may be altered according to the number of levels of wavelet transform applied. The lowpass filter of the mask size of 5×3 as shown in FIG. 10B may be used on code data having undergone three levels of wavelet transform, while the lowpass filter of the mask size of 7×5 as shown in FIG. 10A may be used on code data having undergone five levels of wavelet transform. This is because, the number of pixels influenced by the mirroring operation increases around the tile boundary as the number of levels of wavelet transform applied in the coding process increases. The mask sizes shown in FIGS. 10A and 10B are merely examples, and, any other size may be applied instead such that the desired effect of tile boundary distortion control be acquired therethrough.

Moreover, also in this embodiment, the lowpass filter may be applied around the tile boundary on the YCbCr signal before being transformed into the RGB signal. In this case, the lowpass filter may be applied only to the luminosity signal Y, and not to the other Cb and Cr signals. This is because, generally speaking, the tile boundary distortion may occur largely depending on the luminosity signal Y. Thereby, by limiting the signal component to apply the lowpass filter, reduction in processing time required can be achieved.

Furthermore, also in this embodiment, the smoothing effect of the lowpass filter may be controlled according to the rate of image data compression in the coding process. This is because, generally speaking, the tile boundary distortion may likely become more noticeable in an image having undergone the higher rate of data compression. Therefore, if a lowpass filter having a strong smoothing effect is applied to an image having undergone a relatively low rate of compression, the relevant portion may become particularly faint, and, as a result, the relevant position may become rather noticeable in this term. On the contrary, even if a lowpass filter having a low smoothing effect is applied to an image having undergone a higher rate of compression, it is difficult to acquire the expected effect of tile boundary distortion control.

For this reason, as shown in FIGS. 20A and 20B, according to the rate of compression which a relevant image has undergone in the coding process, the smoothing effect of the lowpass filter applied is switched between those shown in these figures. For example, in a case of a relevant image having undergone image data compression of the compression rate of 1/20, a lowpass filter as shown in FIG. 20A is applied. In a case of a compression rate 1/40 being applied, a lowpass filter as shown in FIG. 20B is applied.

As can be seen from these figures, as the filter of FIG. 20A has a clearly larger value (at least more than twice) at the center than values at the periphery, this filter has a smaller smoothing effect since the value of the target pixel depends on the same pixel itself clearly rather than on the peripheral pixels thereof. On the other hand, as the filter of FIG. 20B has a not very large value at the center than those at the periphery, i.e., the value becomes gradually smaller from the center toward the periphery, this filter has a large smoothing effect since the value of the target pixel depend not only on the same pixel itself but also on the peripheral pixels at similar rates.

The compression/decompression scheme according to JPEG2000 has been discussed in the embodiments of the present invention. However, any other scheme of image data compression/decompression may be applied thereto instead, as long as the scheme employs a process of including block boundary information (corresponding to tag information" described above) into the compressed code data as in JPEG2000.

According to the above-described embodiment of the present invention, the block boundary distortion can be controlled by controlling the smoothing effect of the lowpass filter in an adaptive manner according to the distance of the target pixel from the block boundary. Thereby, it becomes possible to avoid conspicuousness of block boundaries and, thus, to improve the image quality obtained from even compressed image data.

Figures 21A, 21B, 21C:
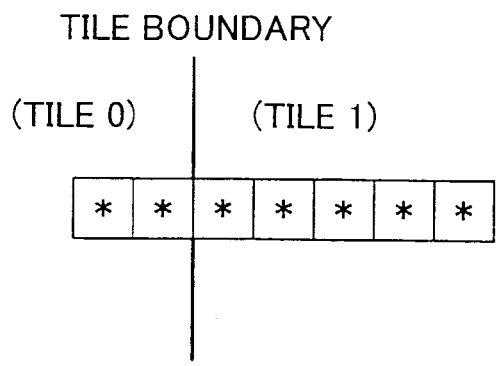
FIGS. 21A through 21C illustrate exemplary adaptive lowpass filter processing using an edge amount near a tile boundary, according to one embodiment of the present invention.

FIGS. 21A through 21C illustrate an example of an adaptive lowpass filter processing according to another embodiment of the present invention which uses an edge amount of each pixel near the tile boundary. FIG. 21A shows a magnified view of pixels around the tile boundary. FIG. 21B shows an example of an edge-amount calculation filter, and FIG. 21C shows an example of an adaptive lowpass filter according to this embodiment of the present invention. In this embodiment, the smoothing effect of the lowpass filter is controlled according to the edge amount of the target pixel near the tile boundary. In one embodiment, the edge amount is calculated for a relevant target pixel near the tile boundary using the edge amount calculation filter shown in FIG. 21B for example.

This edge amount calculation filter has a configuration to calculate the edge amount along the oblique direction. For example, in case this filter shown in FIG. 21B is applied to an image area having completely even/equal pixel values, the total of products between the pixel values and respective filter coefficients becomes zero as the total of the center coefficient (8) and the sum of the oblique-directional coefficients (−1×8) is zero in the filter. However, when pixels arranged along one oblique direction have relatively larger values ('10' each, for example) in comparison to those of the other pixels including those along the other 40-degree oblique direction ('1' each, for example), the total of products between the pixel values and respective filter coefficients becomes 80−10×4−1×4=36.

Thus, a filter such as that shown in FIG. 21B can be used as the edge amount calculation filter. Then, the smoothing effect of the lowpass filter is reduced as the edge amount of the target pixel obtained by using the edge amount calculation filter becomes larger. Thereby, an edge portion present in an original image can be prevented from becoming faint resulting in a blurred restored image. In this embodiment, only 450-degree oblique edges are detected, and the smoothing effect of the lowpass filter is controlled so as not to make the edges become faint. This is because, if horizontal/vertical edges were also detected for the same purpose and processed in the same manner, the edges along the tile boundaries would become noticeable.

An exemplary way to actually control the smoothing effect of the lowpass filter shown in FIG. 21C will now be described. Actually, the coefficient value 'm' at the center of the lowpass filter is increased, as the absolute value of the edge amount detected becomes larger. In the example of the adaptive lowpass filter shown in FIG. 21C, the coefficient 'm' is determined by the following formula (2):

$$m = 8 + abs(E) \quad (2)$$

where 'E' denotes the edge amount detected by using the edge amount calculation filter shown in FIG. 21B, and abs(E) denotes the absolute value of the same. Thereby, the smoothing effect of the lowpass filter applied to the target pixel is reduced as the absolute value of the oblique-directional edge amount of the pixel near the tile boundary becomes larger.

The compression/decompression scheme according to JPEG2000 has been discussed in the embodiments of the present invention. However, any other scheme of image data compression/decompression may be applied instead, as long as the scheme employs a process of including block boundary information into the compressed code data as in the JPEG2000.

According to the currently described embodiment of the present invention, a belt-like image-degraded zone otherwise occurring near the block boundary when an edge amount there is large can be avoided by appropriately controlling the block boundary smoothing function in a manner of appropriately controlling the smoothing effect of the lowpass filter in an adaptive way according to the detected edge amount in the pixel near the block boundary.

Figures 22A, 22B, 22C:
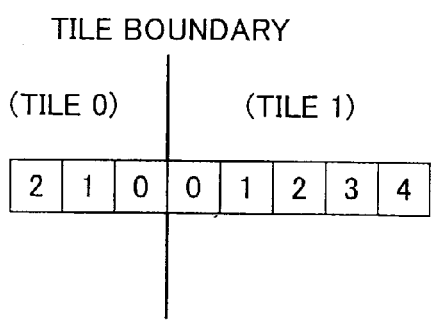
FIGS. 22A through 22C illustrate exemplary adaptive lowpass filter processing using the distance from a tile boundary, and the edge amount near the tile boundary, according to one embodiment of the present invention.

FIGS. 22A through 22C illustrate an example of adaptive lowpass filter processing according to another embodiment of the present invention which uses the distance of the pixel from the tile boundary, as well as the edge amount of the pixel near the tile boundary. FIG. 22A shows pixels near the tile boundary. FIG. 22B shows an example of the edge amount calculation filter as that shown in FIG. 21B, and FIG. 22C shows an example of an adaptive lowpass filter according to this embodiment of the present invention. In this embodiment, the smoothing effect of the lowpass filter is controlled according to the distance of the target pixel from the tile boundary, and also, the edge amount of the same pixel near the tile boundary.

For this purpose, the following items (1) and (2) are calculated on the pixel near the tile boundary.

(1) Distance from the tile boundary (shown in FIG. 22A);

(2) The edge amount near the tile boundary (by using the edge amount calculation filter of edge shown in FIG. 22B, for example).

In this embodiment, the smoothing effect of the lowpass filter is controlled according to the oblique edge amount on the above-mentioned item (2) and the distance from the tile boundary on the above-mentioned item (1). In this embodiment, the filter central coefficient value 'm' shown in FIG. 22C is increased as the absolute value of the oblique edge amount becomes larger or as the distance from the tile boundary becomes larger. In the example of the adaptive lowpass filter shown in FIG. 22C, the central coefficient value 'm' is determined by the following formulas (3) and (4):

$$m = 8, \text{ when } d=0 \quad (3)$$

$$m = max(8 + 64 \times d, \ 8 + abs(E1)), \text{ when } d>0 \quad (4)$$

where 'd' denotes the distance of the target pixel as shown in FIG. 22A; 'abs(E)' denotes the absolute value of the oblique edge amount of the pixel obtained by using the edge amount calculation filter such as that shown in FIG. 22B; and 'max( )', denotes the larger one of the two values enclosed by the parentheses.

Thereby, the smoothing effect of the lowpass filter is reduced as the absolute value of the edge amount of the pixel near the tile boundary becomes larger or the distance in the number of pixels from the tile boundary becomes larger. The reason why the case of d=0 is determined independently from any other factors is that, by unconditionally determining the smoothing effect of the lowpass filter on the pixels right along the tile boundary as large by determining 'm' is '8', it becomes possible to positively prevent the tile boundary from becoming noticeable.

The compression/decompression scheme according to JPEG2000 has been discussed in the embodiments of the present invention. However, any other scheme of image data compression/decompression may be applied there instead, as long as the scheme employs a process of including block boundary information into the compressed code data as in the JPEG2000.

According to this embodiment of the present invention, it becomes possible to prevent image degradation otherwise occurring around the block boundary especially in cases where the edge amount is range there, by controlling the smoothing effect of the lowpass filter in an adaptive manner according to the edge amount of the target pixel, as well as the distance from the edge boundary.

Moreover, also in this embodiment, by controlling the smoothing effect of the lowpass filter according to the number of decomposition levels of wavelet transform applied in the coding process, the block boundary distortion can be controlled without side effects otherwise occurring due to the number of decomposition levels of the wavelet transform applied. Furthermore, by appropriately controlling the smoothing effect of the lowpass filter according to the compression rate in the coding manner applied, the tile boundary distortion control can be effectively applied.

Thus, according to the embodiments of the present invention described above, it becomes possible to effectively control the tile boundary distortion by applying the lowpass filter near the tile boundary, and, also, it becomes possible to control the area to which the lowpass filter is applied. Moreover, image quality degradation otherwise occurring near the block boundary when an edge amount is large, there can be effectively controlled, by appropriately controlling the block boundary distortion by controlling the smoothing effect of the lowpass filter in an adaptive manner.

Figure 23:
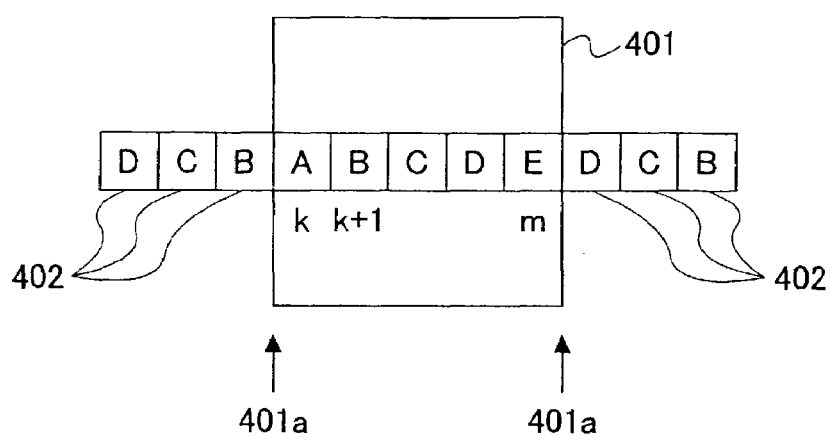
FIG. 23 shows an exemplary technique for increasing pixels using a mirroring method according to the standard tile-division-transform-manner JPEG2000 scheme.

The above-mentioned mirroring operation for increasing pixels performed in the tile-separation-manner wavelet transform will now be described in detail with reference to an example shown in FIG. 23. In this example shown in FIG. 23, a tile 401 obtained from dividing an original image into rectangular tiles as described above is discussed. Respective alphabetical letters A, B, C, D, and E denote pixels. In this example, the first pixel 'A' is the k-th pixel in the entire original image while the last pixel 'E' is the m-th pixel. For the purpose of performing wavelet transform on the tile 401 of original image, several extra pixels before the k-th pixel and after the m-th pixels are needed.

For this purpose, the mirroring operation is performed so as to create these extra pixels from the pixels A through E included in this pixel since the wavelet transform is performed on each tile independently. By performing the mirroring operation, the extra pixels 402 D, C, B shown in FIG. 23, each having the same values as those of the pixels D, C, B originally included in the tile, are created outside of the tile boundaries 401a. Such a manner of performing the mirroring operation for creating the extra pixels to be used for the wavelet transform on the target tile may cause the above-mentioned tile boundary distortion as these created extra pixels have values different from the true values of pixels originally located there.

Figure 24:
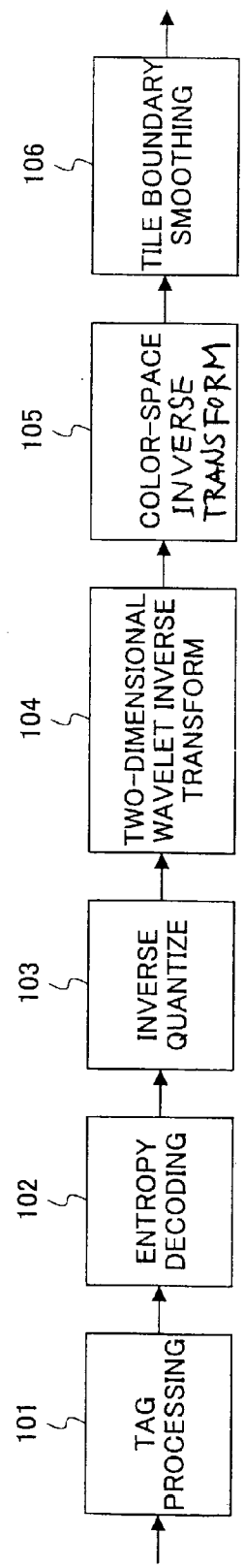
FIG. 24 shows a configuration of a data decompression unit according to an embodiment of the present invention.

FIG. 24 shows a configuration of an image decompression unit according to another embodiment of the present invention. The processing performed from the tag processing unit 101 through the color-space inverse-transform unit 105 is the same as that according to the standard JPEG2000 scheme described above with reference to FIG. 7. In fact, the units 101 through 105 in FIG. 24 correspond to the units 71 through 75 shown in FIG. 7, respectively. In this embodiment, the tile boundary tile smoothing unit 106 is provided after the color-space inverse-transform unit 105. RGB data obtained by the color-space inverse-transform unit 105 undergoes tile boundary smoothing processing by the tile boundary smoothing unit 106 such that pixels near the tile boundary are smoothed so that the tile boundary is made inconspicuous.

FIGS. 25A through 25D illustrate an example of the tile boundary smoothing processing in this embodiment. An original image is divided into four tiles 0 through 3, and a lowpass filter is applied to pixels located near the tile boundaries (painted by gray or having half-tone dots put therein, in FIG. 25A), for example, pixels located in zones within a distance of total 8 pixels on both sides of and extending along each tile boundary.

The lowpass filters which will be described with reference to FIGS. 25B through 25D, 28A through 28C, 29C through 29E, and 30A through 30F have a feature in that the size of the filter is effectively reduced, and is selectively applied in a manner of switching, according to the predetermined relationship with the relevant tile boundary, as will be described. Thereby, it becomes possible to effectively reduce the amount of data processing needed for the filter operation while the expected tile boundary distortion elimination effect can be ensured therefrom.

Figure 25A:
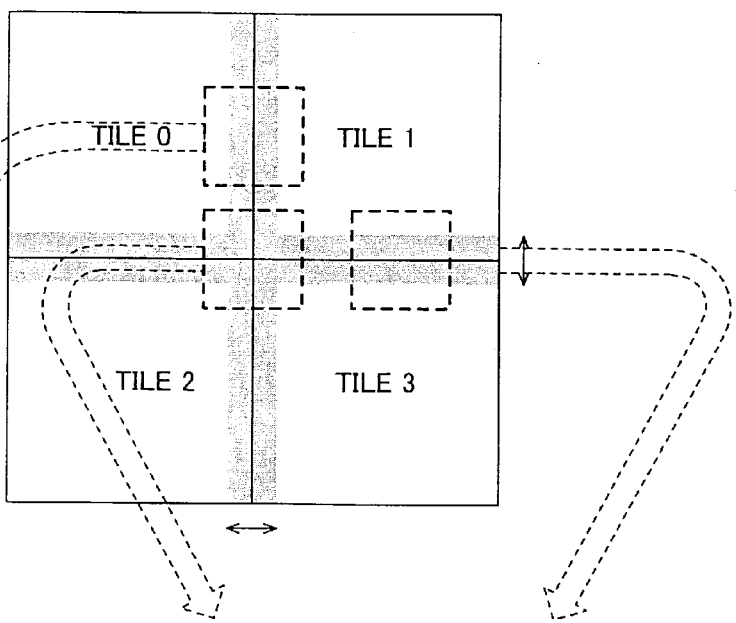
FIGS. 25A through 25D show an exemplary operation of a tile boundary smoothing unit shown in FIG. 24.
Figure 25B:
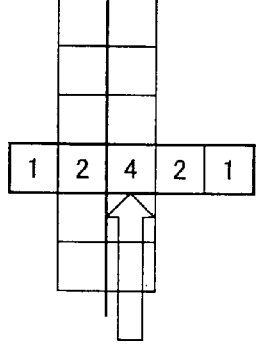

FIG. 25B shows an example of the application of the lowpass filter around the tile boundary along vertical direction. As shown in FIG. 25B, the tile boundary distortion along the vertical direction can be effectively reduced as a result of applying the lowpass filter extending perpendicular to the tile boundary. In this example, a one-dimensional laterally long filter (5 pixels×1 pixel) is applied as shown. However, other than this, any filter may be applied as long as it has frequency characteristics to cause removal of a significant frequency component along the horizontal direction.

Figure 25C:
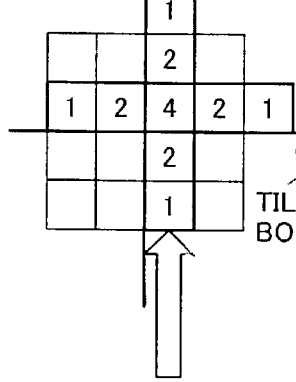
Figure 25D:
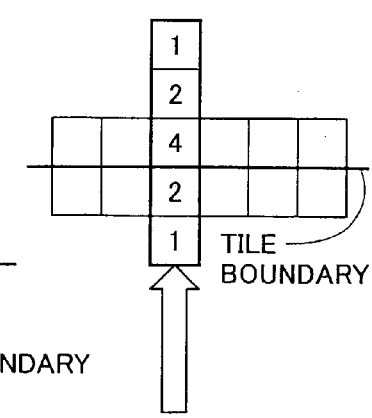

FIG. 25D shows an example of a mode of application of the lowpass filter around the tile boundary lying along horizontal direction. As shown in FIG. 25D, the tile boundary distortion along the horizontal direction can be effectively reduced as a result of applying the lowpass filter extending perpendicular to the tile boundary. In this example, a one-dimensional laterally long filter (1 pixel×5 pixels) is applied as shown. However, other than this, any filter may be applied as long as it has frequency characteristics that would cause the removal of a significant frequency component along the vertical direction.

FIG. 25C shows an example of a mode of application of the lowpass filter around an intersection of the tile boundaries. As shown, the tile boundary distortion of near the tile boundary intersection can be effectively reduced by applying a cross-shaped lowpass filter. However, other than this, any filter may be applied as long as it has frequency characteristics that would cause the removal of a significant frequency component along both the vertical and horizontal directions. The compression/decompression scheme according to JPEG2000 has been discussed in the embodiments of the present invention. However, any other scheme of image data compression/decompression may be applied there instead, as long as the scheme employs a process of including block boundary information into the compressed code data as in the JPEG2000.

Figure 26:
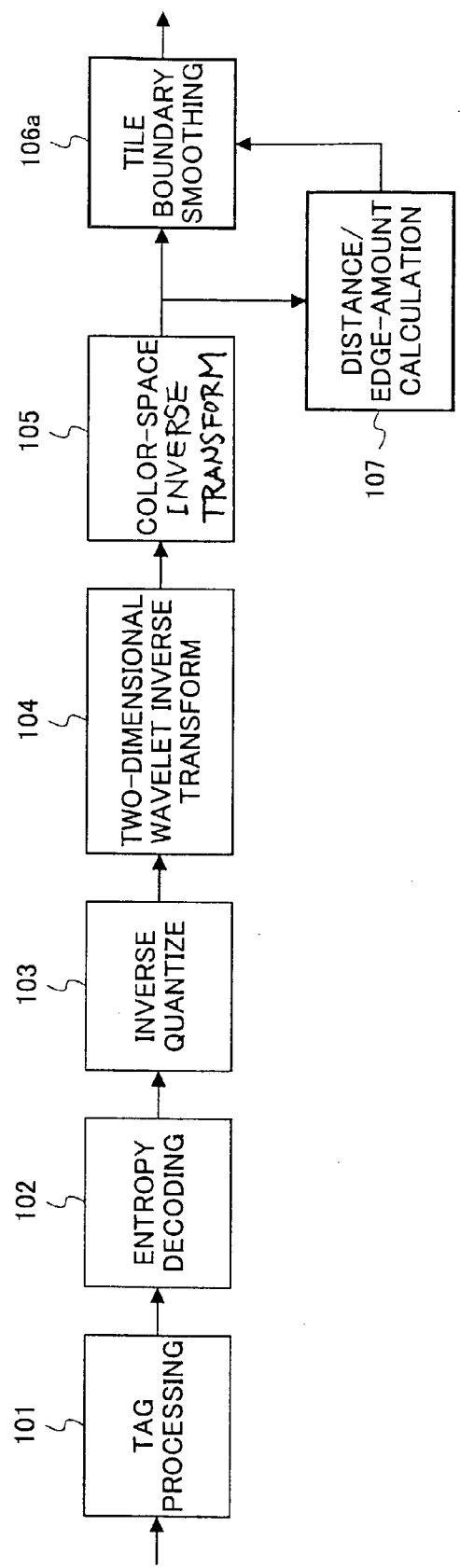
FIG. 26 shows a configuration of a data decompression unit according to another embodiment of the present invention.

FIG. 26 shows a configuration of an image data decompression unit according to another embodiment of the present invention. The processing from the tag processing unit 101 through the color-space inverse-transform unit 105 is the same as that of the standard JPEG2000 scheme as in the previously described embodiment. In this embodiment, a distance/edge-amount calculation unit 107 which calculates the edge amount of the target pixel and the distance in the number of pixels from the tile boundary near the tile boundary is provided. The calculated values of distance and the edge amount are input to a tile boundary tile boundary smoothing unit 106a.

Figures 27, 28A, 28B, 28C:
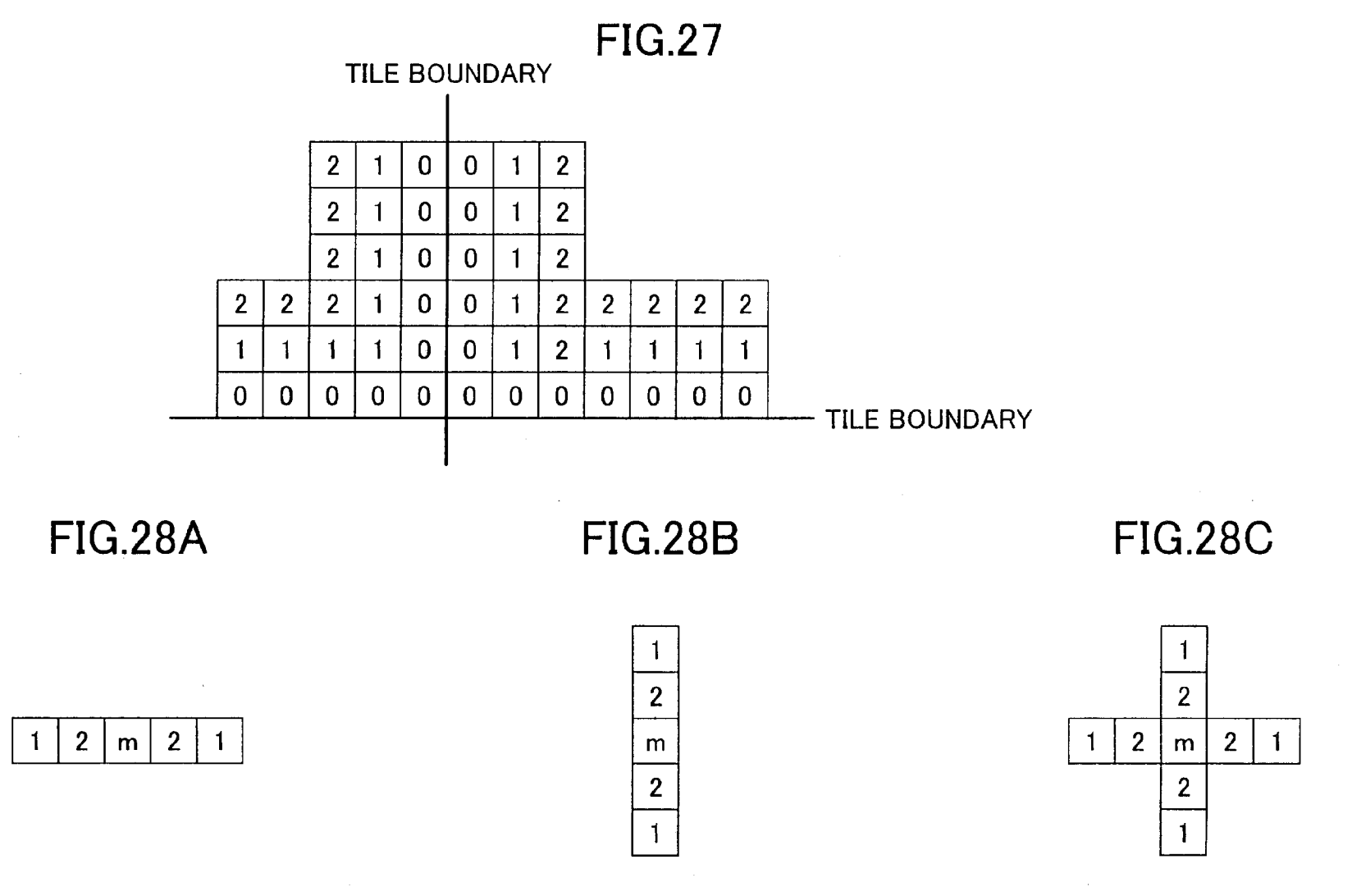

First, in this embodiment, the smoothing effect of the lowpass filter employed in the tile boundary tile boundary smoothing unit 106a is switched according to the distance from the tile boundary. FIG. 27 illustrates an exemplary way to calculate the distance from the tile boundary, similar to FIG. 18. Same as in the above-described embodiments, for each target pixel, the distances from the vertical and horizontal tile boundaries are calculated first. Then, the minimum value thereof is regarded as the distance from the tile boundary on the relevant pixel finally. The position of each tile boundary and the direction thereof are acquired using the relevant information (tag information described above, for example) originally included in the relevant code data according to the JPEG2000 standard image data coding scheme.

As shown in FIG. 28A, in this embodiment, the one-dimensional lowpass filter arranged in the horizontal direction is applied to pixels near the tile boundary lying along the vertical direction. As shown in FIG. 28B, the one-dimensional lowpass filter arranged in the vertical direction is applied to pixels near the tile boundary lying along the horizontal direction. As shown in FIG. 28C, the cross-shaped lowpass filter arranged in the horizontal and vertical directions is applied to pixels near a crossing point or an intersection of the tile boundaries.

Same as in the previously described embodiment, any other type of lowpass filter may be applied as long as it removes or effectively reduces in magnification a frequency component along the horizontal direction on pixels near the tile boundary lying along the vertical direction. Similarly, any type of lowpass filter may be applied as long as it removes or effectively reduces in magnification a frequency component along the vertical direction on pixels near the tile boundary lying along the horizontal direction. Similarly, any type of lowpass filter may be applied as long as it removes or effectively reduces in magnification a frequency component along each of both the horizontal and vertical directions on pixels near a crossing point of the tile boundaries.

In this embodiment, any of the lowpass filters shown in FIGS. 28A through 28C is applied in an adaptive manner according to the distance of the target pixel from the tile boundary. That is, in this example, only the coefficient (the coefficient 'm' at the center of each filter) at the position of the target pixel is controlled. The value of this coefficient 'm' is gradually increased as the distance from the tile boundary becomes larger. In the example of FIGS. 28A through 28C, the central coefficient 'm' is calculated by the following formula (5):

$$m=4+64\times d \quad (5)$$

where 'd' denotes the distance counted in the number of pixels from the tile boundary described above with reference to FIG. 27.

Accordingly, as the central coefficient of the lowpass filter is increased as the distance from the tile boundary increases, thereby, the smoothing effect of this filter is reduced accordingly. It is noted that, for example, in case the filter shown in FIG. 28A is applied to pixels, the value of target pixels determined as a weighted average of products between the respective coefficients of the filter and corresponding pixel values. That is, in this case, when this filter is applied to pixels having values of A, B, C, P and E, the value C' of the target pixel is obtained by the following expression:

$$C'=(1\times A+2\times B+m\times C+2\times D+1\times E)/(1+2+m+2+1)$$

The same may be applied for all the filters 10 described in the specification of the present application.

Moreover, in this embodiment, the smoothing effect of the lowpass filter intensity of the tile boundary smoothing unit 6a is also controlled according to the above-mentioned edge amount of the pixel from a tile boundary.

FIGS. 29A through 29E illustrate this processing in which the smoothing effect of the lowpass filter applied is controlled according to the distance from the tile boundary and ascending to the edge amount.

The distance/edge-amount calculation unit 107 shown in FIG. 26 calculates on the target pixel: (1) the distance from the tile boundary (as shown in FIG. 29A); and (2) the edge amount by using an edge amount calculation filter shown in FIG. 29B (same as that shown in FIG. 21B).

Figures 29A, 29B, 29C, 29D, 29E:
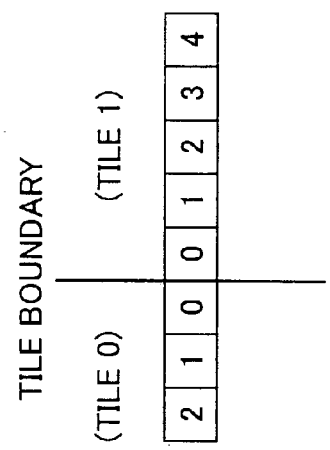
FIGS. 29A through 29E illustrate lowpass filter control according to the distance from a tile boundary and the edge amount, according to one embodiment of the present invention.

In this embodiment, as in the embodiment described immediately above, on pixels around the tile boundary lying vertical direction, the lowpass filter long along the horizontal direction as shown in FIG. 29C is applied. Similarly, on pixels around the tile boundary lying horizontal direction, the lowpass filter long along the vertical direction as shown in FIG. 29D is applied. On pixels around an intersection of tile boundaries, the cross-shaped lowpass filter long as shown in FIG. 29E is applied.

As described above, any other type of low pass filter may be applied as long as it removes a frequency component along the horizontal direction on pixels near the tile boundary lying along the vertical direction. Similarly, any type of lowpass filter may be applied as long as it removes a frequency component along the vertical direction on pixels near the tile boundary lying along the horizontal direction. Similarly, any type of lowpass filter may be applied as long as it has a function of removing a frequency component along each of both the horizontal and vertical directions on pixels near a crossing point of the tile boundaries.

Then, the smoothing effect of the lowpass filter applied is controlled according to the calculated distance from the tile boundary and the oblique-directional edge amount.

Specifically, the central coefficient 'm' of the lowpass filter is increased as the absolute value of the edge amount is increased, or the distance from the tile boundary is increased. Specifically, in one embodiment, the central coefficient 'm' is determined by the following formulas (6) through (8):

When d=0, $$m=4+\mathrm{abs}(E), \text{ when } \mathrm{abs}(E)\geq 255 \quad (6)$$

$$m=4, \text{ when } \mathrm{abs}(E)<255 \quad (7)$$

When d>0, $$m=\max(4+64\times d, 4+\mathrm{abs}(E)) \quad (8)$$

where 'd' denotes the distance from the tile boundary as shown in FIG. 29A, 'abs(E) denotes the absolute value of the oblique-directional edge amount calculated as described above, and max ( ) denotes the larger one of the two enclosed by the parentheses.

Thus, the smoothing effect of the lowpass filter is reduced as the absolute value of the edge amount of the pixel becomes larger, or the distance in the number of pixels from the tile boundary becomes larger. The reason why the case of d=0 is determined independently from any other factors is that, by unconditionally determining the smoothing effect of the lowpass filter on the pixels right along the tile boundary as large by determining 'm' is '8', it becomes possible to positively prevent the tile boundary from becoming conspicuous.

The compression/decompression scheme according to JPEG2000 has been discussed in the embodiments of the present invention. However, any other scheme of image data compression/decompression may be applied there instead, as long as the scheme employs a process of including block boundary information into the compressed code data as in the JPEG2.000.

According to this embodiment of the present invention, it becomes possible to prevent image degradation otherwise occurring around the block boundary especially in case the edge amount is large there, by controlling the block boundary distortion by controlling the smoothing effect of the lowpass filter in an adaptive manner according to the edge amount of the target pixel, as well as the distance from the edge boundary. Moreover, also in this embodiment, by controlling the smoothing effect of the lowpass filter according to the number of decomposition levels of wavelet transform applied in the coding scheme, the block boundary distortion can be controlled without side effects otherwise occurring due to the number of decomposition levels of the wavelet transform applied. Furthermore, by appropriately controlling the smoothing effect of the lowpass filter according to the compression rate in the coding manner applied in the coding scheme, the effective tile boundary distortion control can be achieved.

FIGS. 30A through 30F illustrate lowpass filters employed in the tile boundary smoothing unit of the image data decompression unit according to another embodiment of the present invention in which the filter characteristics vary according to the rate of compression in the wavelet coding. In this embodiment, the intensity of the lowpass filter is made variable according to the rate of compression applied in the coding scheme.

Generally, the tile boundary distortion is noticeable for an image having undergone with the higher rate of compression in the coding scheme. Therefore if a lowpass filter having a strong smoothing effect is applied to an image having undergone a relatively low rate of compression, the relevant portion may become faint, and, as a result, the relevant position may become rather noticeable thereby. On the contrary, if a lowpass filter having a low smoothing effect is applied to an image having undergone a higher rate of compression, it is difficult to acquire the expected effect of tile boundary distortion control therefrom.

For this reason, as shown in FIGS. 30A through 30F, according to the rate of compression which a relevant image has undergone, the smoothing effect of the lowpass filter applied is switched between those shown in these figures. For example, in a case of a relevant image having undergone image data compression of the compression rate of 1/40, lowpass filters as shown in FIGS. 30A through 30C are applied. That is, FIG. 30A shows the filter to be applied around the tile vertically lying tile boundary, FIG. 30B shows the filter to be applied around the tile horizontally lying tile boundary, and FIG. 30C shows the filter to be applied around an intersection of the tile boundaries, in the same manner as those shown in FIGS. 28A through 29C.

Similarly, in a case of a relevant image has undergone image data compression of the compression rate 25 of 1/20, lowpass filters as shown in FIGS. 30D through 30F are applied. That is, FIG. 30D shows the filter to be applied around the tile vertically lying tile boundary, FIG. 30E shows the filter to be applied around the tile horizontally lying tile boundary, and FIG. 30F shows the filter to be applied around an intersection of the tile boundaries, in the same manner as those shown in FIGS. 28A through 29C.

As can be seen from these figures, as each of the filters of FIGS. 30A through 30C has a relatively small value at the center and has gradually reduced values at the periphery thereof, these filters have a relatively large smoothing effect since the value of the target pixel is determined not only the original pixel value itself but also those of the peripheral pixels having relatively even values. On the other hand, as each of the filters of FIGS. 30D through 30F has a relatively large value at the center and has suddenly reduced values at the periphery thereof, these filter have a relatively small smoothing effect since the value of the target pixel is determined largely depending on the original pixel value itself and in a relatively small rate depending op those of the peripheral pixels.

Thus, according to this embodiment of the present invention, the tile boundary distortion can be well controlled by applying a lowpass filter near the tile boundary. Also, in case of any rate of compression is applied in the coding scheme, the tile boundary distortion control can be effectively achieved as a result of applying the lowpass filter of the selected smoothing effect according to the rate of compression in the coding scheme.

Also in this embodiment, as in the first embodiment as described with reference to FIGS. 8 and 9, data coded using three levels of wavelet transform is such that pixels thereof near the tile boundary, in particular, 8 pixels from the tile boundary receives influence of coding distortion according to the JPEG2000 standard. Accordingly, the lowpass filter may be applied to the 8 pixels (total 16 pixels on both ends) from the tile boundary including the pixels right on the tile boundary as shown in FIG. 8 so as to eliminate the influence of coding distortion.

Similarly, data coded using two levels of wavelet transform is such that pixels near the tile boundary, in particular, 4 pixels from the tile boundary receives influence of coding distortion according to the JPEG2000 standard. Accordingly, the lowpass filter may be applied to the 4 pixels (total 8 pixels on both ends) from the tile boundary including the pixels right on the tile boundary as shown in FIG. 9 so as to eliminate the influence of coding distortion.

Thus, as to data coded using n levels of wavelet transform (decomposition levels, described above with reference to FIGS. 3A through 3D), the lowpass filter may be applied to pixels in a range through the n-th power of 2 of pixels counted from the tile boundary.

Thus, according to this configuration, the range through which a low pass filter is applied is selected according to the number of wavelet-transform decomposition levels applied in the coding scheme. However, the range of pixels counted from the tile boundary through which a low pass filter is applied may be instead, or in addition, adjusted in terms of the balance of the required costs, the required processing time, and the image quality obtained therefrom demanded.

Furthermore, it is possible to apply a scheme in which a lowpass filter to be applied is switched according to the details of the wavelet transform method applied in the coding scheme. For example, there are various types of wavelet transform methods applying a 5×3 filter, a 9×7 filter, and so forth. Then, lowpass filters having different frequency characteristics may be selectively applied for the cases of applying these respective types of wavelet transform methods.

Thus, according to this configuration, it becomes possible to effectively reduce the adverse influence of coding distortion around the tile boundary distortion by applying a lowpass filter, and, also, it becomes possible to choose the range over which the lowpass filter is applied. The compression/decompression scheme according to JPEG2000 has been discussed in the embodiments of the present invention. However, any other scheme of image data compression/decompression may be applied there instead, as long as the scheme employs a process of including block boundary information into the compressed code data as in the JPEG2000.

The present invention described above with reference to the respective embodiments may be embodied either by a hardware, i.e., electronic circuits in a form of LSI circuits, or the like, or a software program together with a general-purpose computer. In the latter case, respective units embodying the present invention, i.e., a block dividing unit, a compression/decompression unit, block boundary distortion reducing unit, and so forth described above, are embodied in a form of respective steps (instructions) of a software program which cause the general-purpose computer to operate as those parts, which software program may be recorded in an information recording medium such as a CD-ROM. Then, the CPU of the computer reads this program, and executes the steps so as to actually embody the present invention described above.

Further, the present invention is not limited to the above-described embodiments, and variations and modifications maybe made without departing from the basic concepts of the present invention.

The present application is based on Japanese priority applications Nos. 2001-400647 and 2002-178984, filed on Dec. 28, 2001 and Jun. 19, 2002, the entire contents of which are hereby incorporated by reference.

What is claimed is:

1. An image processing apparatus for generating image data from a code stream coded with the use of wavelet transform, comprising:

a tag processing unit to interpret tag information added to the code stream and to decompose the code stream into coded streams of respective tiles of respective components;

an inverse quantization unit to determine a target bit position to decode in an order based on the tag information and to generate a context from peripheral bits of the target bit;

an entropy decoding unit to generate the target bit by decoding with probability estimation with the context and the code stream and to write the target bit in the target bit position;

a wavelet inverse transform unit to perform an inverse wavelet transform on the decoded data from the entropy decoding unit and to restore the respective tiles of the respective components of the image data;

a color space inverse transform unit to generate the image data with a color space inverse transform from the restored data from the wavelet inverse transform unit; and a tile boundary smoothing unit to perform smoothing processing on a tile boundary of the image data generated by the color space inverse transform unit, wherein:

the tile boundary smoothing unit is operable to optimize a range in which a lowpass filter is applied to the image data according to the number of levels of the wavelet transform applied at the time of coding the image data.

2. The image processing apparatus as claimed in claim 1, wherein:

the tile boundary smoothing unit applies the lowpass filter to the pixel range of power of 2 of the tile boundary.

3. The image processing apparatus as claimed in claim 1, wherein:

the tile boundary smoothing unit applies the lowpass filter having a mask size variable according to the number of levels of the wavelet transform applied at the time of coding of the image data.

4. An image processing apparatus for generating image data from a code stream coded with the use of wavelet transform, comprising:

a tag processing unit to interpret tag information added to the code stream and to decompose the code stream into coded streams of respective tiles of respective components;

an inverse quantization unit to determine a target bit position to decode in an order based on the tag information and to generate a context from peripheral bits of the target bit;

an entropy decoding unit to generate the target bit by decoding with probability estimation with the context and the code stream and to write the target bit in the target bit position;

a wavelet inverse transform unit to perform an inverse wavelet transform on the decoded data from the entropy decoding unit and to restore the respective tiles of the respective components of the image data;

a color space inverse transform unit to generate the image data with color space inverse transform from the restored data from the wavelet inverse transform unit; and a tile boundary smoothing unit to perform smoothing processing on a tile boundary part of the image data generated by the color space inverse transform unit, wherein:

the tile boundary smoothing unit is operable to optimize a range in which a lowpass filter is applied to the data generated by the wavelet inverse transform unit according to the number of levels of the wavelet transform applied at the time of coding the image data.

5. The image processing apparatus as claimed in any one of claims 1–4, wherein:

the lowpass filter comprises a lowpass filter vertical to the tile boundary or a cross-shaped lowpass filter.

6. An image processing method for generating image data from a code stream coded with the use of wavelet transform, comprising:

interpreting tag information added to the code stream and decomposing the code stream into coded streams of respective tiles of respective components;

determining a target bit position to decode in an order based on the tag information and generating a context from peripheral bits of the target bit;

generating the target bit by decoding with probability estimation with the context and the code stream and writing the target bit in the target bit position;

performing an inverse wavelet transform on the decoded data and restoring the respective tiles of the respective components of the image data;

generating the image data with a color space inverse transform from the restored data; and performing smoothing processing on a tile boundary of the image data generated with the color space inverse transform, including optimizing a range in which a lowpass filter is applied to the image data according to the number of levels of the wavelet transform applied at the time of coding the image data.

7. The image processing method as claimed in claim 6, wherein performing smoothing processing on a tile boundary of the image data includes applying the lowpass filter to the pixel range of power of 2 of the tile boundary.

8. The image processing apparatus as claimed in claim 6, wherein performing smoothing processing on a tile boundary of the image data includes applying the lowpass filter having a mask size variable according to the number of levels of the wavelet transform applied at the time of coding of the image data.

9. An image processing method for generating image data from a code stream coded with the use of wavelet transform, comprising:

interpreting tag information added to the code stream and decomposing the code stream into coded streams of respective tiles of respective components;

determining a target bit position to decode in an order based on the tag information and generating a context from peripheral bits of the target bit;

generating the target bit by decoding with probability estimation with the context and the code stream and writing the target bit in the target bit position;

performing an inverse wavelet transform on the decoded data and restoring the respective tiles of the respective components of the image data;

generating the image data with color space inverse transform from the restored data; and performing smoothing processing on a tile boundary part of the image data generated with the color space inverse transform, including optimizing a range in which a lowpass filter is applied to the data generated by performing the wavelet inverse transform according to the number of levels of the wavelet transform applied at the time of coding the image data.

10. The image processing method as claimed in any one of claims 6–9, wherein:

the lowpass filter comprises a lowpass filter vertical to the tile boundary or a cross-shaped lowpass filter.

11. An article of manufacture having one or more computer readable media storing instructions thereon which, when executed by a system, cause the system to perform an image processing method for generating image data from a code stream coded with the use of wavelet transform, the method comprising:

interpreting tag information added to the code stream and decomposing the code stream into coded streams of respective tiles of respective components;

determining a target bit position to decode in an order based on the tag information and generating a context from peripheral bits of the target bit;

generating the target bit by decoding with probability estimation with the context and the code stream and writing the target bit in the target bit position;

performing an inverse wavelet transform on the decoded data and restoring the respective tiles of the respective components of the image data;

generating the image data with a color space inverse transform from the restored data; and performing smoothing processing on a tile boundary of the image data generated with the color space inverse transform, including optimizing a range in which a lowpass filter is applied to the image data according to the number of levels of the wavelet transform applied at the time of coding the image data.

* * * * *

UNITED STATES PATENT AND TRADEMARK OFFICE
CERTIFICATE OF CORRECTION

PATENT NO.         : 7,302,104 B2                                           Page 1 of 1
APPLICATION NO. : 10/330588
DATED              : November 27, 2007
INVENTOR(S)        : Tooru Suino It is certified that error appears in the above-identified patent and that said Letters Patent is hereby corrected as shown below:

Title Page, in the Assignee item (73), please delete "Ricoh Co., Ltd., Tokyo (JP)" and insert -- Ricoh Company, Ltd., Tokyo (JP) --.

Signed and Sealed this

Eleventh Day of November, 2008

JON W. DUDAS
*Director of the United States Patent and Trademark Office*